US010929910B2

(12) United States Patent
Markeci et al.

(10) Patent No.: US 10,929,910 B2
(45) Date of Patent: Feb. 23, 2021

(54) METHOD AND APPARATUS FOR PROVIDING A MARKETPLACE FOR DISTRIBUTORS AND BUSINESSES

(71) Applicants: Saba Mario Markeci, Oviedo, FL (US); Mondi Diamand Markeci, Fruitland Park, FL (US); David James Van Beekum, Apopka, FL (US)

(72) Inventors: Saba Mario Markeci, Oviedo, FL (US); Mondi Diamand Markeci, Fruitland Park, FL (US); David James Van Beekum, Apopka, FL (US)

( * ) Notice: Subject to any disclaimer, the term of this patent is extended or adjusted under 35 U.S.C. 154(b) by 779 days.

(21) Appl. No.: 15/492,607

(22) Filed: Apr. 20, 2017

(65) Prior Publication Data
US 2018/0308146 A1    Oct. 25, 2018

Related U.S. Application Data

(60) Provisional application No. 62/325,511, filed on Apr. 21, 2016.

(51) Int. Cl.
*G06Q 30/00* (2012.01)
*G06Q 30/06* (2012.01)
*G06F 3/0481* (2013.01)

(52) U.S. Cl.
CPC ..... *G06Q 30/0629* (2013.01); *G06F 3/04812* (2013.01); *G06Q 30/06* (2013.01); *G06Q 30/0601* (2013.01); *G06Q 30/0603* (2013.01); *G06Q 30/0611* (2013.01); *G06Q 30/0613* (2013.01); *G06Q 30/0627* (2013.01); *G06Q 30/0633* (2013.01); *G06Q 30/0635* (2013.01); *G06Q 30/0641* (2013.01); *G06Q 30/0643* (2013.01)

(58) Field of Classification Search
CPC ............. G06Q 30/0601–0645; G06Q 30/08
USPC ............................................. 705/26.1–27.2
See application file for complete search history.

(56) References Cited

U.S. PATENT DOCUMENTS 5,712,989 A    1/1998    Johnson
5,947,903 A    8/1999    Perry
(Continued)

OTHER PUBLICATIONS

Charlton, Graham, Which B2B ecommerce sites are getting it right?, Econsultancy, Jul. 29, 2014, accessed at [https://econsultancy.com/which-b2b-ecommerce-sites-are-getting-it-right-here-s-15-of-the-best/] (Year: 2014).*

*Primary Examiner* — Jeffrey A. Smith
*Assistant Examiner* — Lindsey B Smith
(74) *Attorney, Agent, or Firm* — Wolter Van Dyke Davis, PLLC; Cian O'Brien; John L. DeAngelis

(57) ABSTRACT

A method and apparatus is provided for displaying data related to a transaction of one or more products from one or more sellers by a buyer. The method includes receiving identifying criteria from the buyer and determining one or more products corresponding to the identifying criteria. The method further includes determining one or more sellers of the one or more products. The method further includes presenting the one or more sellers for each of the one or more products on a display, where the one or more sellers are presented in an order according to criteria. The method further includes presenting an order history of the buyer from the one or more sellers for each product on the display. Additionally, the method further includes presenting a total price of a particular quantity for each product on the display.

18 Claims, 17 Drawing Sheets

(56) References Cited

U.S. PATENT DOCUMENTS

| | | | |
|---|---|---|---|
| 6,023,683 A | | 2/2000 | Johnson |
| 7,107,226 B1 * | | 9/2006 | Cassidy ............. G06Q 30/0625 |
| | | | 705/26.62 |
| 2003/0023507 A1 * | | 1/2003 | Jankelewitz ....... G06Q 30/0631 |
| | | | 705/26.81 |
| 2003/0066977 A1 | | 4/2003 | Hoffman |
| 2003/0083998 A1 | | 5/2003 | Ramachandran |
| 2004/0019494 A1 * | | 1/2004 | Ridgeway .......... G06Q 10/0637 |
| | | | 705/26.1 |
| 2010/0082419 A1 * | | 4/2010 | Au-Yeung .............. G06Q 30/00 |
| | | | 705/14.19 |
| 2015/0120482 A1 * | | 4/2015 | Kourpas ............ G06Q 30/0605 |
| | | | 705/26.2 |
| 2017/0024804 A1 * | | 1/2017 | Tepfenhart, Jr. ... G06Q 30/0635 |

* cited by examiner

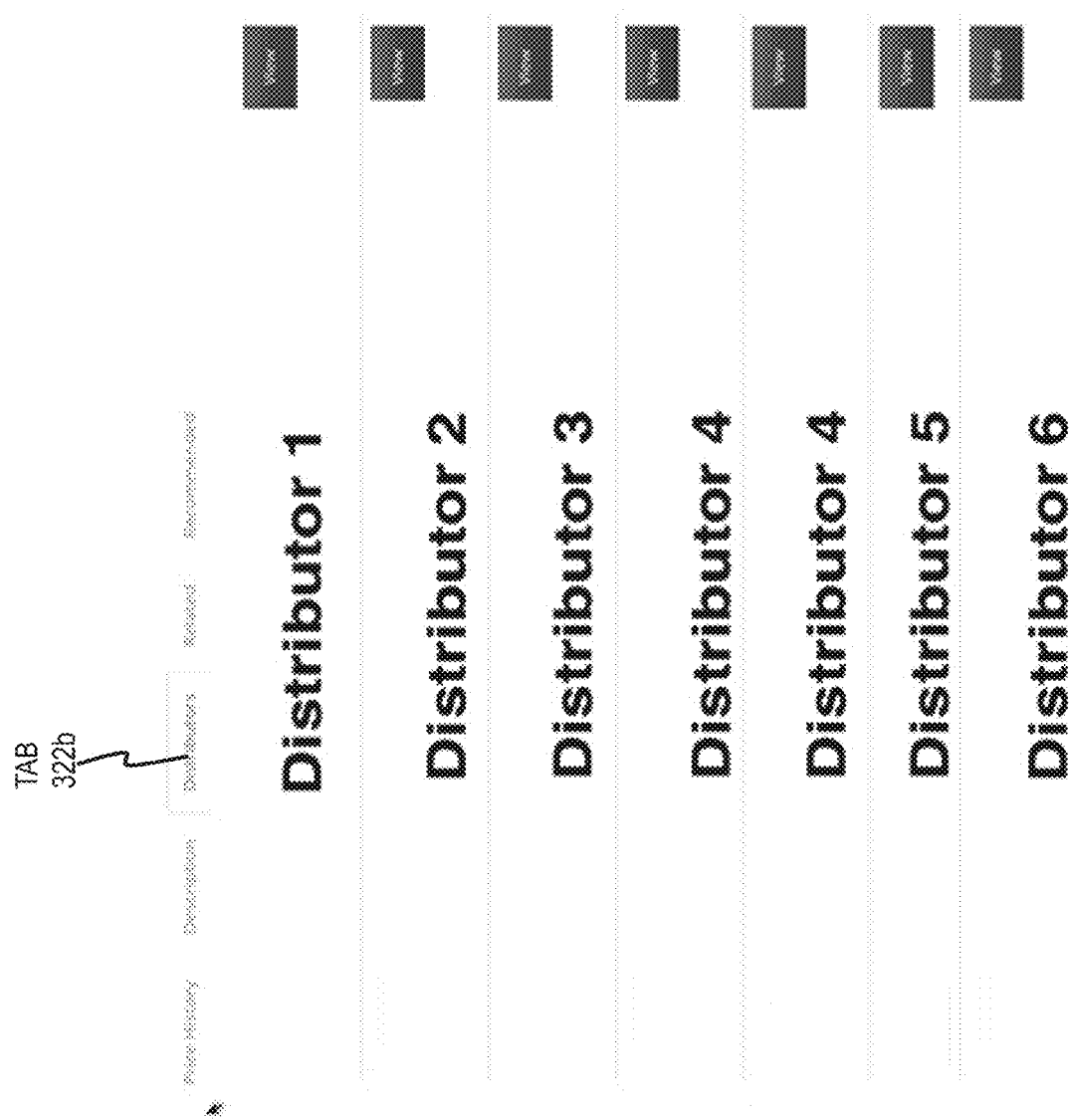

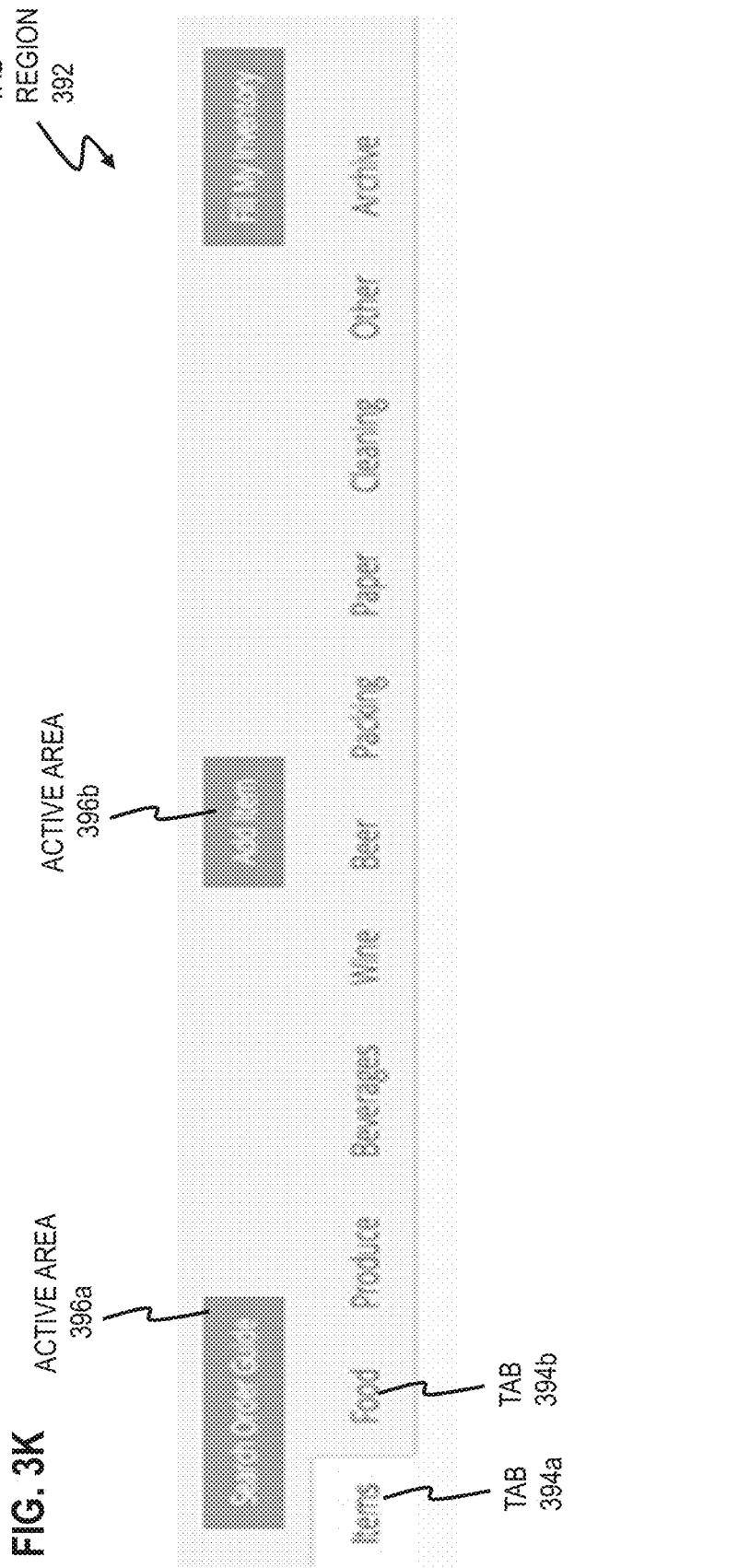

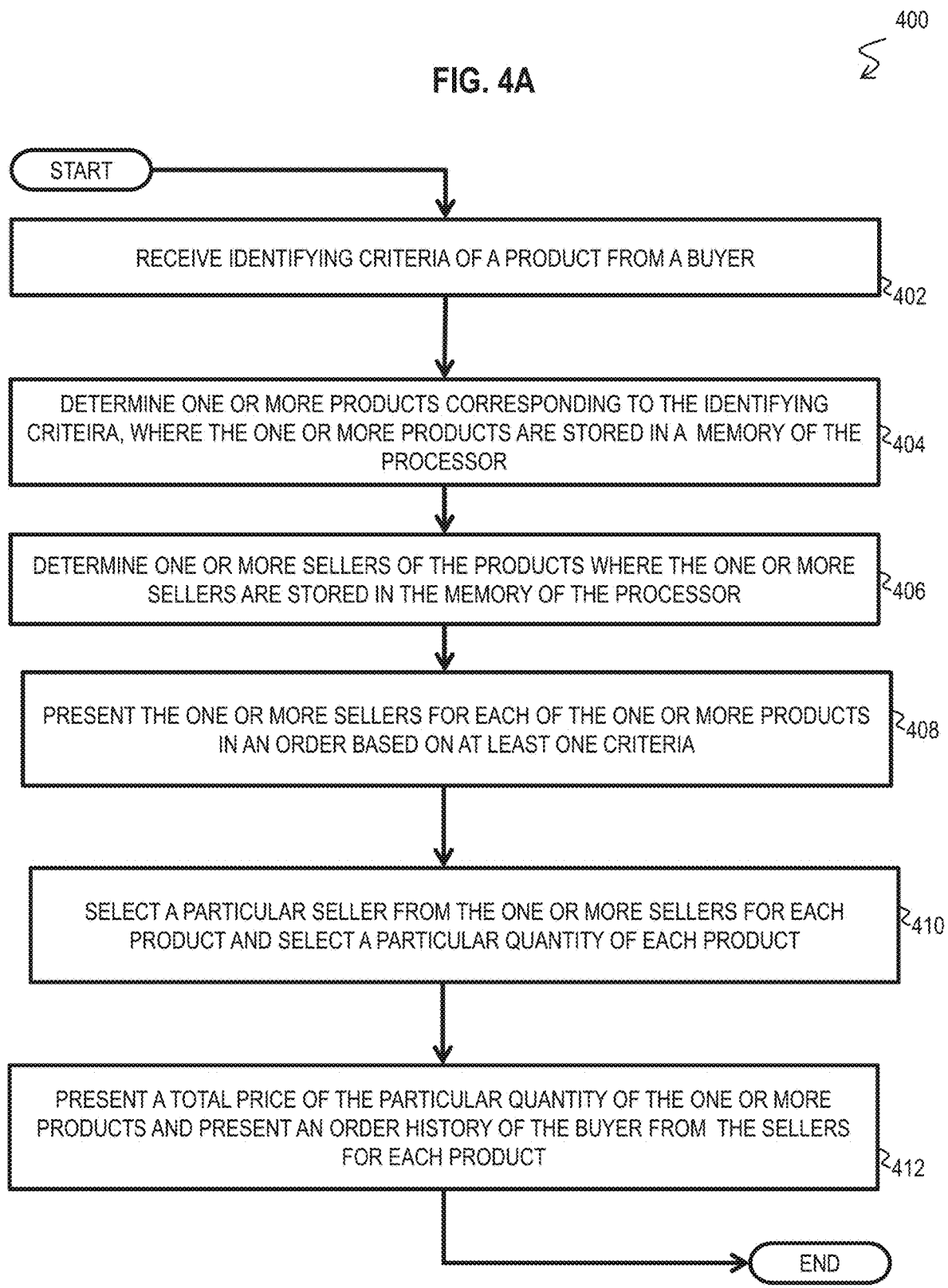

METHOD AND APPARATUS FOR PROVIDING A MARKETPLACE FOR DISTRIBUTORS AND BUSINESSES

CROSS-REFERENCE TO RELATED APPLICATIONS

This application claims priority to the U.S. Provisional Application No. 62/325,511, entitled, "Methods and Systems Relating to a Distributor's Marketplace for Access by Business Owners and Retailers" filed Apr. 21, 2016, and is incorporated herein, in its entirety.

BACKGROUND

Transactions between distributors and businesses are currently facilitated using representatives of each distributor that visit businesses and attempt to initiate a business relationship between the distributor and the business. Once the distributor representative signs up the business and takes their order, the business waits to receive the order from the distributor.

In order for the business to obtain products from distributors that meet one or more criteria of the business, owners of the business must research multiple distributors to see which meet their criteria (e.g. price, review score, location, shipping time, product availability, etc). If a representative of a distributor shows up at the business and requests a relationship with the business, the owner of the business cannot confirm whether this distributor is superior to all of the other distributors, in terms of meeting the one or more criteria of the business.

SUMMARY

It is here recognized that conventional methods used to facilitate commerce between distributors and businesses are deficient. In order for the owner of the business to confirm which distributor among all distributors meets one or more criteria (e.g. price, product availability, review score, location, shipping time, etc.) for that business, the owner must spend large amounts of time researching each distributor. This reduces the efficiency of the business, since it depletes resources that could otherwise be spent operating the business. Additionally, the conventional methods that facilitate relationships between distributors and businesses involve representatives of the distributor visiting the business, often at inopportune times, which further reduces the efficiency of the business. Additionally, since the owner of the business cannot confirm whether each distributor is ideal for that business, the business owner is not informed when asked to initiate a business relationship by a representative of one distributor.

The inventors of the present invention developed a method that overcomes these noted drawbacks of conventional methods, by developing a marketplace that links distributors with businesses. In one embodiment, a business visits the marketplace and selects one or more products that the business is interested in purchasing. The marketplace displays a list of distributors that sell the selected products, and ranks the distributors according to one or more criteria. The business owner can then select a particular distributor to supply the business with each product, based on whether the particular distributor meets one or more criteria of the business. The marketplace transmits an order to the particular distributor along with information of the business (e.g. location, etc.) in order to finalize the transaction.

In a first set of embodiments, a method is provided for displaying data related to a transaction of one or more products from one or more sellers by a buyer. The method includes receiving identifying criteria from the buyer. The method further includes determining one or more products corresponding to the identifying criteria, where the one or more products are stored in a memory of a processor. The method further includes determining one or more sellers of the one or more products, where the one or more sellers are stored in the memory of the processor. The method further includes presenting the one or more sellers for each of the one or more products on a display, where the one or more sellers are presented in an order according to criteria. The method further includes presenting an order history of the buyer from the one or more sellers for at least one product on the display. Additionally, the method further includes presenting a total price of a particular quantity for each product on the display, in response to selection of the particular quantity of each product.

In a second set of embodiments, a method is provided for displaying data related to a transaction of one or more products from one or more sellers by a buyer. The method includes receiving identifying criteria of a product from the buyer. The method further includes presenting a first indicator in each active area of a seller region on a display where each active area corresponds to one of the sellers. The active areas in the seller region are displayed in an order based on at least one criteria. A respective seller region is displayed for each product. The method further includes presenting a second indicator in each active area of a product region on the display, where each product region corresponds to one of the products. The method further includes presenting order history data of the product between the buyer and the one or more sellers, where the order history data is presented in an active area of the product region. The method further includes presenting a total payment of the transaction in an active area in a transaction region, where the total payment of a desired quantity of the one or more products from a particular seller.

In a third set of embodiments, an apparatus is provided for displaying data related to the transaction of one or more products from one or more sellers by a buyer. The apparatus includes a processor, a memory including one or more sequences of instructions and a data structure including two or more records and where each record includes two or more fields. The memory and the sequence of instructions are configured to, with the processor, cause the apparatus to perform one or more steps of the above method.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 3E is an image that illustrates an example of a distributor view for displaying a list of distributors that sell a product in FIG. 3C, according to an embodiment;

FIG. 3K is an image that illustrates an example of the tab region of the order guide view of FIG. 3B, according to an embodiment;

FIG. 4A is a flow diagram that illustrates an example of a method for displaying data related to a transaction of one or more products from one or more distributors, according to an embodiment;

DETAILED DESCRIPTION

Figure 1:
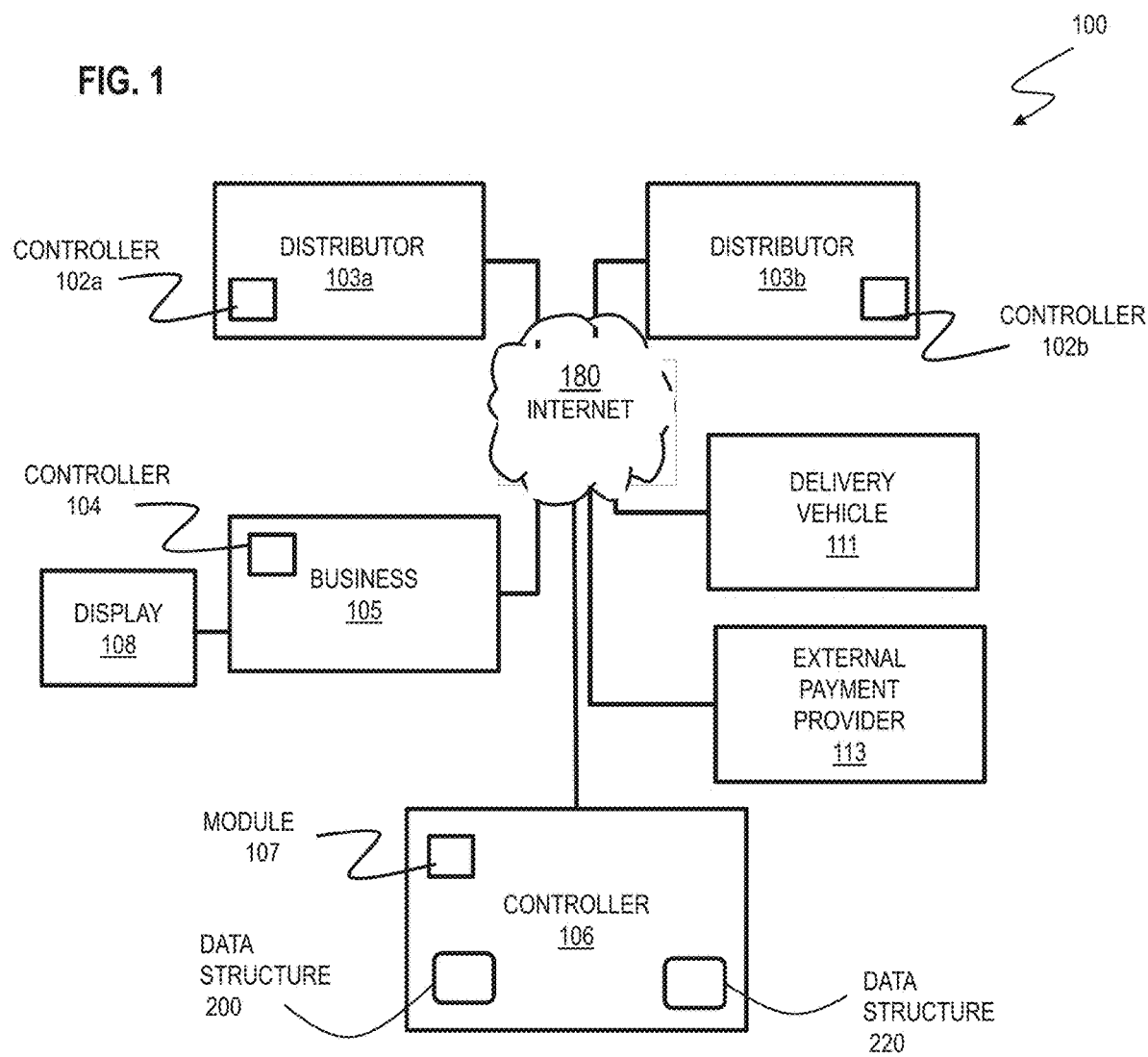
FIG. 1 is a block diagram that illustrates an example system for displaying data related to a transaction of one or more products from one or more distributors, according to an embodiment.

A method and apparatus are described for displaying data related to a transaction of one or more products from one or more sellers by a buyer. A method and apparatus is also described for displaying data related to a transaction of one or more services from one or more service providers by a consumer. A method and apparatus is also described for providing a marketplace for facilitating transactions between distributors and businesses or retailers. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of facilitating transactions of goods between buyers and sellers. In other embodiments, the invention is described in the context of facilitating transactions of goods between distributors and businesses. In still other embodiments, the invention is described in the context of facilitating transactions of goods between distributors and retailers. Other embodiments of the invention are described below in the context of the display of data related to any of the above transactions. In still other embodiments, the invention is described in the context of facilitating transaction of services between providers and consumers of the services. In an example embodiment, the invention is described in the context of the transaction of such services as cell phone plans, periodic office cleanings (e.g. weekly), appliance maintenance (e.g. dishwashing machine) or any type of service package that can be matched from different service providers.

As used herein the term "seller" refers to any entity that sells goods including distributors, retailers, businesses, individuals and non-profit organizations. As used herein the term "distributor" refers to any company who supplies goods or services to a business or retail environment. In some embodiments, "distributor" refers to any company that supplies goods to stores and other businesses that sell to customers. In other embodiments, "distributor" refers to any company that supplies services to stores or other businesses that sell services to customers. As used herein the term "buyer" refers to any entity that purchases goods or services including businesses, retailers, individuals, non-profit organizations. As used herein the term "business" or "retailer" refers to a licensed business that sells goods to customers.

As used herein the term "order history" refers to a number of prior transactions and/or units sold between a buyer (e.g. business) and a seller (e.g. distributor) over a previous time period. In one embodiment, the previous time period is 30 days. In another embodiment, the previous time period is 90 days. In still other embodiments, the previous time period can be adjusted to any length of time (e.g. days, weeks, years, etc). In still other embodiments, "order history" involves calculation of a pattern of how often the buyer makes an order over the previous time period. In an example embodiment, the pattern is calculated by determining a length of time (e.g. days, weeks, months, etc) between consecutive transactions over the previous time period. In an example embodiment, the pattern is determined based on whether the lengths of time between consecutive transactions are within a threshold of each other. In an example embodiment, the threshold is in a range of ±5% to ±20%.

1. Overview

FIG. 1 is a block diagram that illustrates an example system 100 for facilitating transactions between buyers and sellers, according to an embodiment. In an embodiment, the system 100 is for displaying data relating to a transaction between one or more distributors 103 and a business 105 for one or more products or services, according to an embodiment. Although the examples below discuss the processing and displaying of data relating to the transaction of goods, the same principles can be employed for processing and displaying of data relating to the transaction of services.

Figure 5:
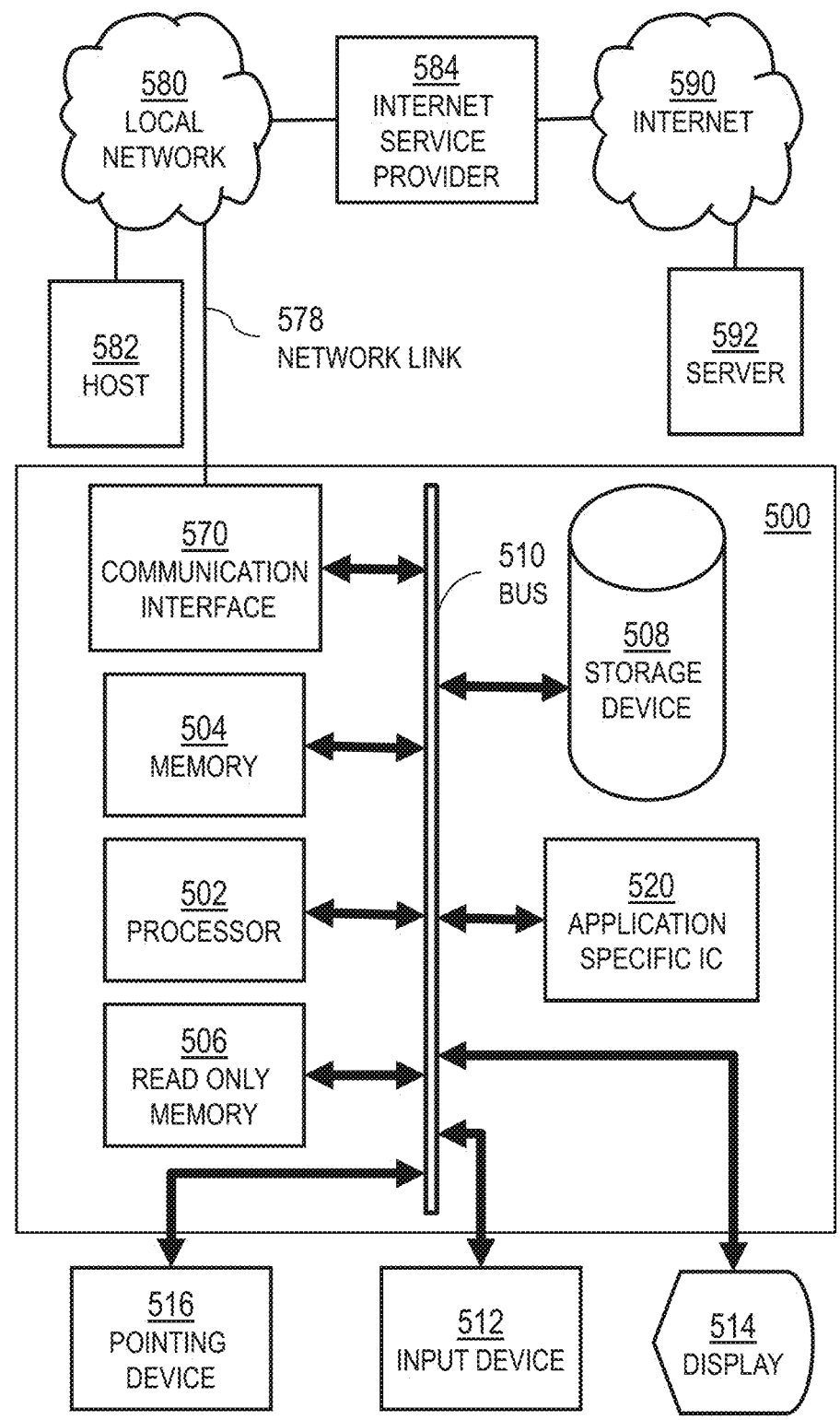
FIG. 5 is a block diagram that illustrates a computer system upon which an embodiment of the invention may be implemented.
Figure 6:
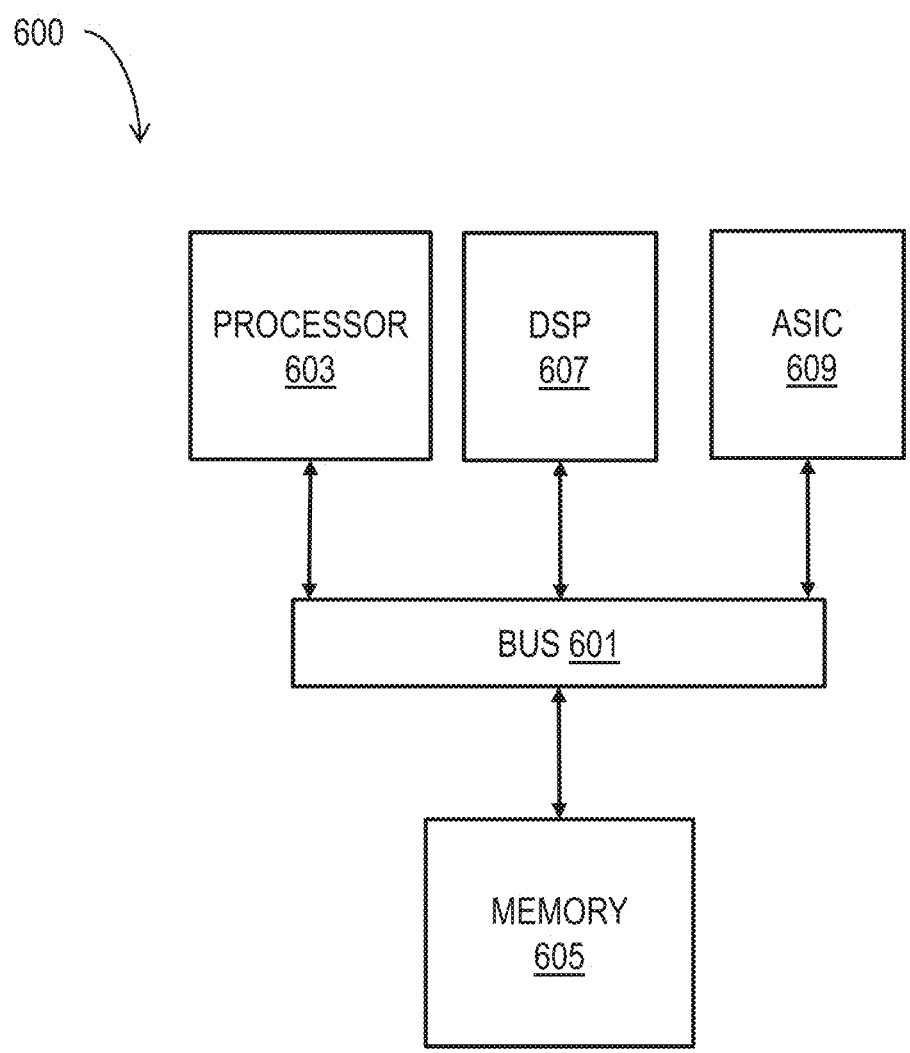
FIG. 6 is a block diagram that illustrates a chip set upon which an embodiment of the invention may be implemented.
Figure 7:
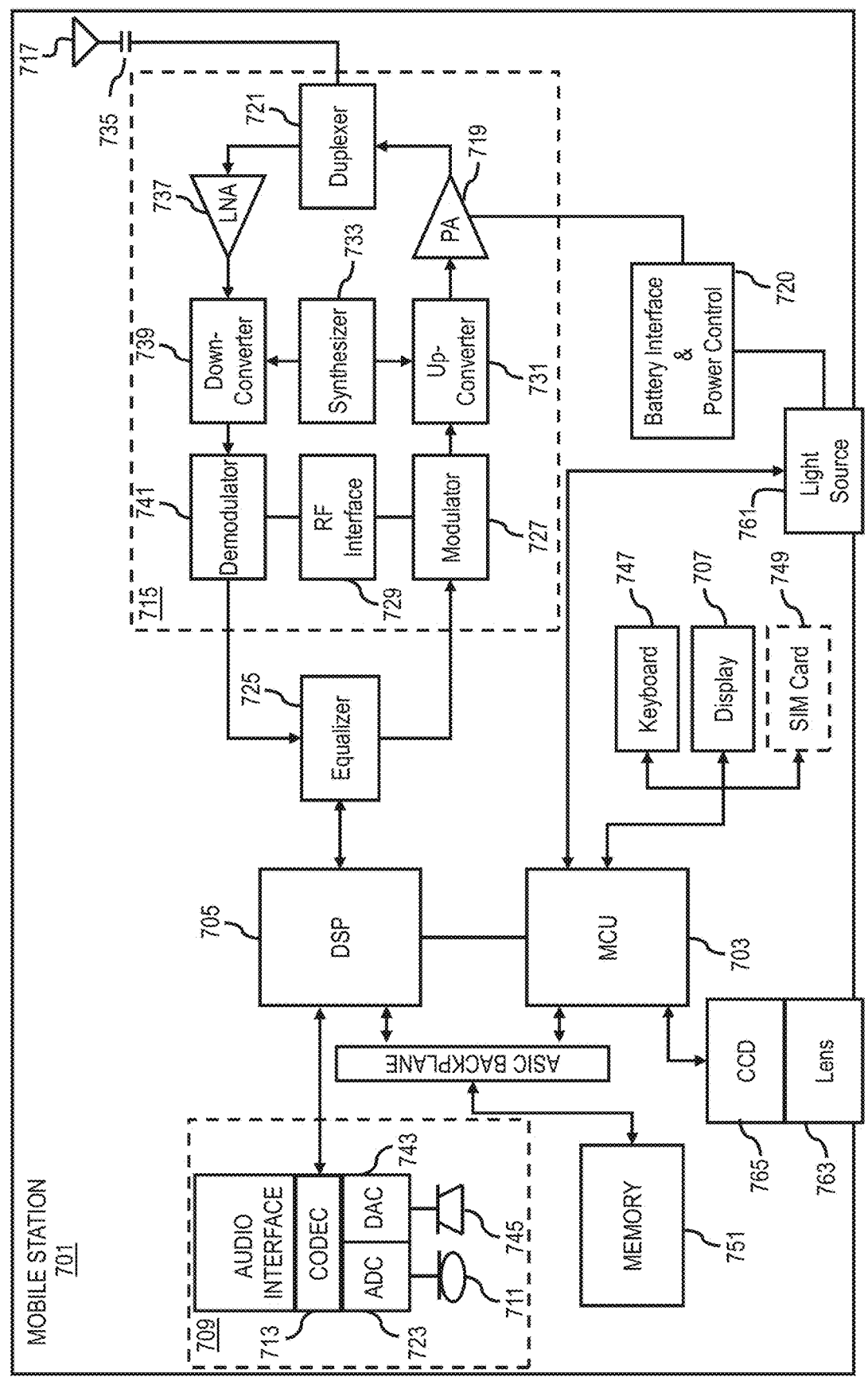
FIG. 7 is a diagram of exemplary components of a mobile terminal 700 (e.g., cell phone handset) for communications, which is capable of operating in the system of FIG. 2C, according to one embodiment.

The system 100 includes a plurality of distributors 103a, 103b and a business 105, where the business 105 is seeking to initiate a relationship with one or more of the distributors 103a, 103b, for the purpose of purchasing one or more products from the distributors. Distributor controllers 102a, 102b and a business controller 104 are in connection through a network (e.g. internet 180). Each distributor controller 102a, 102b is operated by a respective distributor 103a, 103b and the business controller 104 is operated by the business 105. Although FIG. 1 An depicts two distributors 103a, 103b and a single business 105 connected to the system 100, the system is not limited to this arrangement and includes embodiments where more than two distributors and more than one business are connected to the system. In various embodiments, the controllers 102, 104 comprise one or more general purpose computer systems, as depicted in FIG. 5 or one or more chip sets as depicted in FIG. 6 or one or more mobile terminals as depicted in FIG. 7. As further depicted in FIG. 1, a display 108 is connected to the business controller 104.

Additionally, the system 100 includes a marketplace controller 106 that is connected to the distributor controllers 102a, 102b and business controller 104 through the network. In some embodiments, the controller 106 includes a module 107 to perform one or more steps of a method described below with reference to FIG. 4A. In other embodiments, the controller 106 includes the module 107 to perform one or more steps of a method described below with reference to FIG. 4B. In various embodiments, the controller 106 comprises one or more general purpose computer systems, as depicted in FIG. 5 or one or more chip sets as depicted in FIG. 6, and instructions to cause the computer or chip set to perform one or more steps of a method described below with reference to FIG. 4A or one or more steps of a method described below with reference to FIG. 4B. In some embodiments, the module 107 of the controller 106 is configured to present data relating to a transaction of one or more products from one or more distributors 103a, 103b on the display 108 connected to the business controller 104.

Additionally, in some embodiments, the system 100 includes a delivery vehicle 111 to ship products from the distributors 103 to the business 105. In some embodiments, at various stages of the delivery, a signal with location information of the product is transmitted from the delivery vehicle 111 (through the network) to the controller 106. In an example embodiment, the signal is provided when a package containing the product is scanned (e.g. using any scanner that is appreciated by one skilled in the art) at various stages along a route to the business 105. If the location information in the received signal is within a certain threshold of the business 105 location (e.g. 1 mile or 10 minutes), the controller 106 is configured to transmit an alert signal (e.g. via email or text or through a mobile app) to the business 105 over the network. In still other embodiments, the controller 106 is configured to transmit an alert signal to the business 105 for each received signal from the delivery vehicle 111, to update the business 105 of every updated location of the product along a delivery route to the business 105.

Additionally, in some embodiments, the system 100 includes an external payment provider 113 connected to the network. In these embodiments, when a business 105 registers with the system 100, secure payment information (e.g. bank account information, credit card number, etc) is stored with the external payment provider 113. After storing the secure payment information of the business 105, the external payment provider 113 tokenizes the payment information in the form of a token and transmits the token to the controller 106. In this embodiment, the token of the business 105 is stored in a memory of the controller 106 and the secure payment information is not stored in the memory of the controller 106.

Figure 2A:
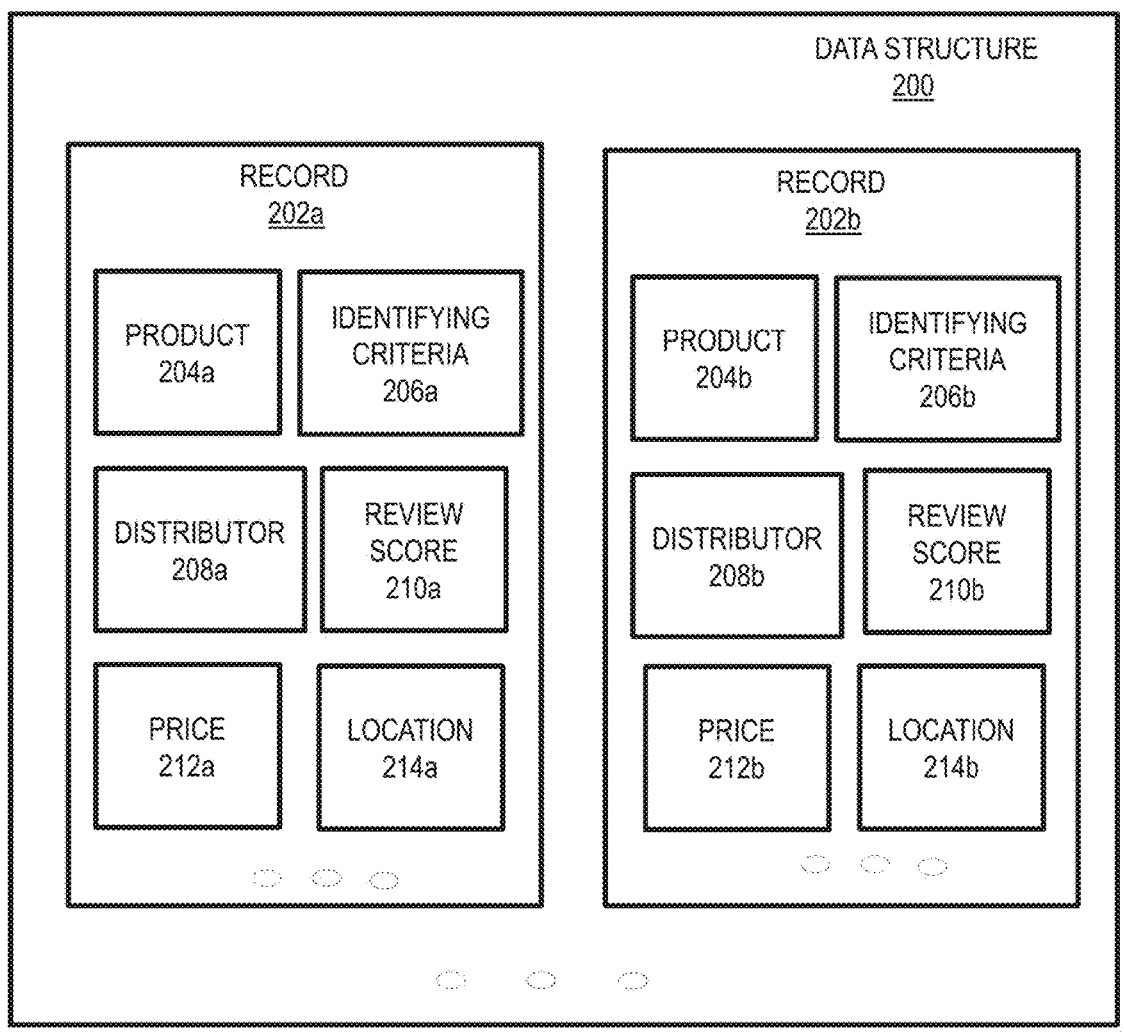
FIG. 2A is a block diagram that illustrates an example data structure used to store product data, according to an embodiment.

FIG. 2A is a block diagram that illustrates an example data structure 200 used to store product data, according to an embodiment. In some embodiments, the data structure 200 is stored in a memory of the controller 106. In some embodiments, when a distributor 103 connects to the system 100, the controller 106 sends a signal to the distributor controller 102 requesting product data of each product sold by the distributor 103. In one embodiment, the product data includes one or more of data indicating each product (e.g. product name), data indicating identifying criteria of each product (e.g. search term, UPC, SKU, etc), data indicating the distributor (e.g. distributor name), data indicating a review score of the product (e.g. 5-star review score), data indicating a price of the product and data indicating a location (e.g. delivery area) of the distributor. Upon receiving the product data from each distributor 103, the controller 106 stores the product data in one more records 202 of the data structure 200. In some embodiments, each record 202 includes a first field 204 to store data indicating each product, a second field 206 to store data indicating the identifying criteria, a third field 208 to store data indicating the distributor 103, a fourth field 210 to store data indicating the review score, a fifth field 212 to store data indicating the price and a sixth field 214 to store data indicating the location (e.g. delivery area) of the distributor 103. In one embodiment, the controller 106 stores product data in a respective record 202 for each product sold by the distributor 103. In another embodiment, the controller 106 stores product data from each distributor 103 that connects with the system 100 so that the data structure 200 includes records 202 that store product data of every product sold by every distributor 103 connected with the system 100. In some embodiments, the data structure 200 has less than each of the fields depicted in FIG. 2A.

Figure 2B:
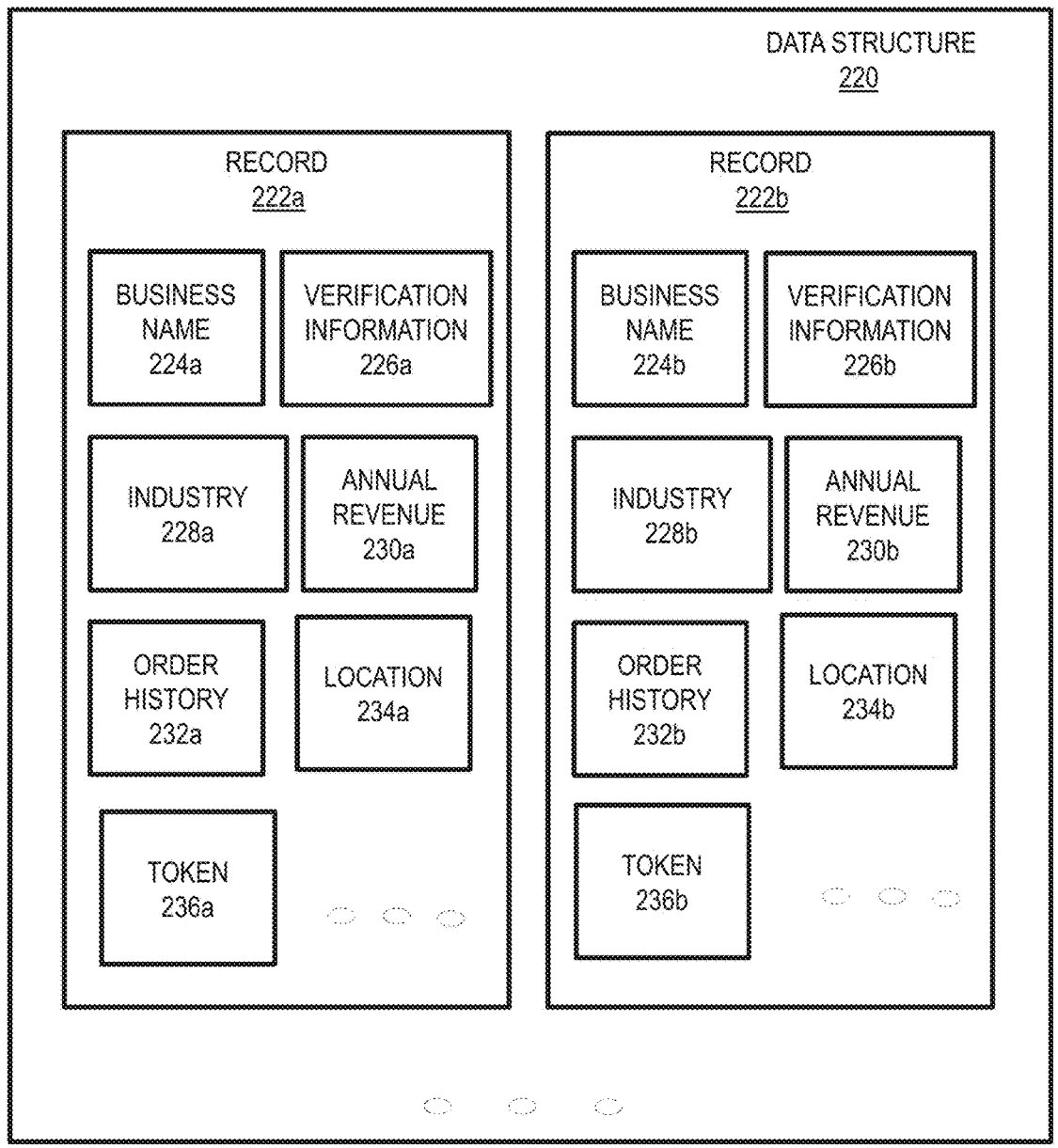
FIG. 2B is a block diagram that illustrates an example data structure used to store business data, according to an embodiment.

FIG. 2B is a block diagram that illustrates an example data structure 220 used to store business data, according to an embodiment. In some embodiments, the data structure 220 is stored in a memory of the controller 106. In some embodiments, when a business 105 connects to the system 100, the controller 106 sends a signal to the business controller 104 requesting one or more criteria of the business 105. In one embodiment, the criteria of the business 105 includes one or more of a name of the business, verification information of the business (e.g. business license, tax identification, etc.), an industry of the business, an annual revenue of the business, an order history between the business 105 and one or more distributors 103, a location of the business and payment information of the business. Upon receiving the criteria from each business 105, the controller 106 stores the criteria in a respective record 222 of the data structure 220. In some embodiments, each record 222 includes a first field 224 to store data indicating the business name, a second field 226 to store data indicating the verification information, a third field 228 to store data indicating the industry of the business, a fourth field 230 to store data indicating the annual revenue, a fifth field 232 to store data indicating the order history, a sixth field 234 to store data indicating the location of the business, and a seventh field 236 to store data indicating the token of the business (e.g. received from external payment provider 113). In one embodiment, the controller 106 stores criteria in a respective record 222 for each business 105 connected with the system 100. In some embodiments, upon receiving the criteria of the business 105, a representative of the system 100 verifies that the criteria is accurate and authentic. In an example embodiment, the representative checks with one or more government records to check that the verification information (e.g. business license) is authentic. In some embodiments, upon verifying the business criteria, the controller 106 transmits a relationship request signal to one or more distributors 103 connected to the system 100, where the relationship request signal includes the business criteria. Upon receiving a confirmation signal from each distributor 103, the controller 106 authorizes the business 105 to order products from each distributor 103 through the system 100.

In some embodiments, upon confirming a relationship between the distributor 103 and the business 105, a direct point-to-point messaging system is established between the distributor 103 and the business 105. In an example embodiment, this messaging system can be used by the business 105 to initially contact a representative of the distributor 103, for ongoing communications about orders, for ongoing communications about new products or customer service. In this example embodiment, the messaging system is provided between the distributor 103 and business 105 through the controller 106. In another example embodiment, this messaging system permits distributors 103 to send notifications (e.g. push notifications, emails, text, or blast) to businesses 105 where a relationship request is confirmed, and send them updates about new products or special offers or sales on existing products.

In other embodiments, the data structure 220 includes other fields to store specific documents, such as contracts, tax forms, sales certificates and invoices. In these embodiments, the distributors 103 who confirmed a relationship request with the business 105 are provided access to these fields, for purposes of sharing documents with the business 105. Additionally, in other embodiments, the stored documents in these fields can be electronically filed and shared between the distributors 103 and business 105.

Although processes, equipment, and data structures are depicted in FIG. 1, FIG. 2A and FIG. 2B as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Although data structures, messages and fields are depicted in FIGS. 2A and 2B, as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

Figure 3A:
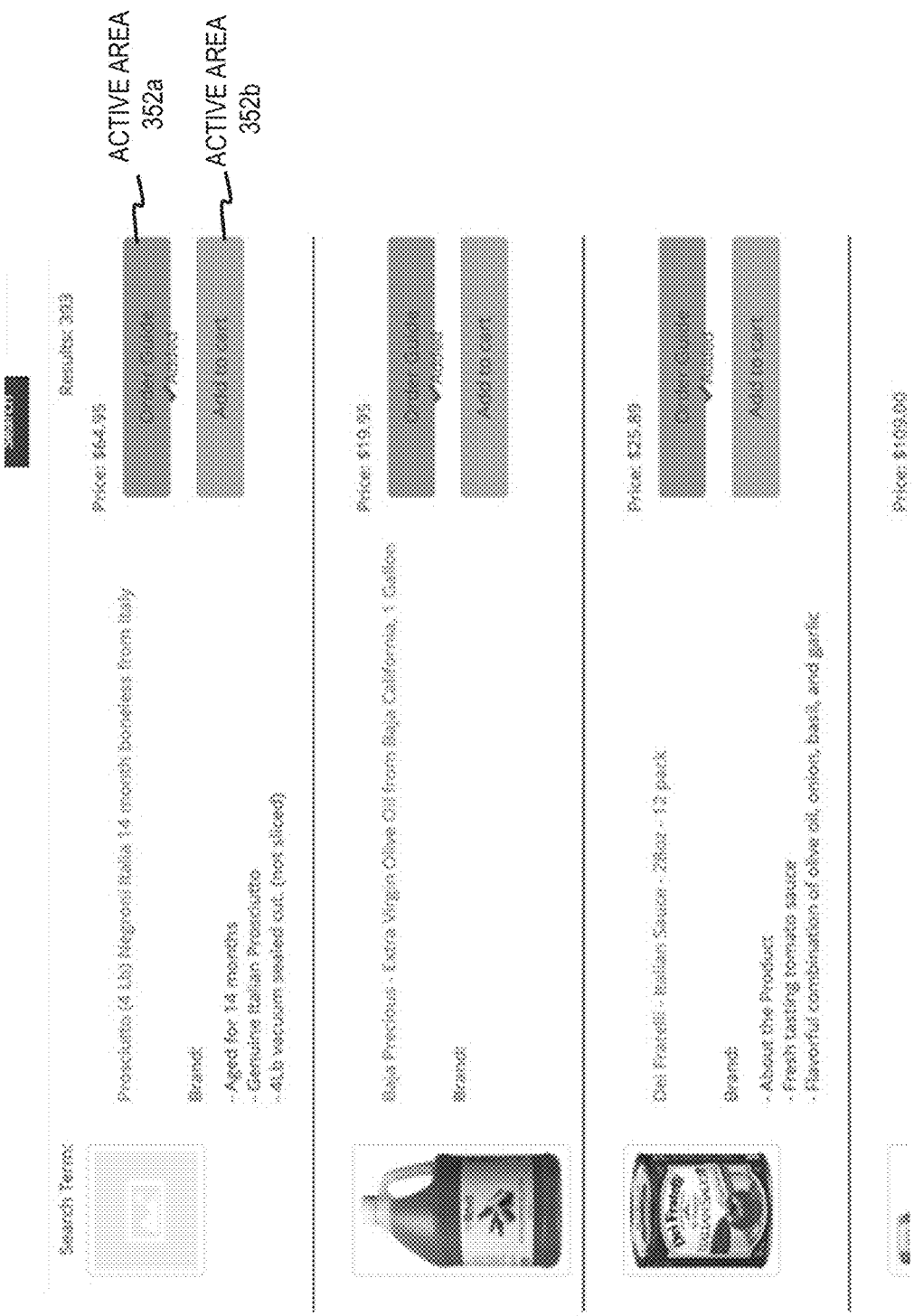
FIG. 3A is an image that illustrates an example of a view of search items based on inputted identifying criteria, according to an embodiment.

FIG. 3A is an image that illustrates an example of a view 350 of search items based on inputted identifying criteria, according to an embodiment. In order to perform a transaction on the system 100, a business 105 representative inputs identifying criteria (e.g. search term, UPC, SKU, etc) of one or more products that the business is interested in purchasing from distributors. In an example embodiment, the business 105 representative inputs "pasta sauce" as the identifying criteria. In response to the inputted identifying criteria, the view 350 of search items is presented on the display 108 that is viewed by the business representative. In some embodiments, the controller 106 generates the list of products in the view 350 by using to inputted identifying criteria to search the second field 206 data (e.g. identifying criteria) of each record 202 in the data structure 200, where the list of products is based on the first field 204 data (e.g. product name) of those records 202 where the second field 206 data matched the inputted identifying criteria.

In some embodiments, for each product listed in the view 350 of search items, a first active area 352a is provided and a second active area 352b is provided. In one embodiment, selection of the first active area 352a (e.g. with a mouse or other input device) causes the controller 106 to add the product to a custom order guide associated with the business 105. In some embodiments, selection of the first active area 352a for a product automatically causes the controller 106 to transmit the relationship request signal to all distributors 103 that sell the added product. In this embodiment, the product is subsequently added to the custom order guide of the business 105, when one or more distributors 103 confirm the relationship request. In an example embodiment, the business 105 can only purchase the added product from those distributors 103 that confirm the relationship request. In other embodiments, selection of the second active area 352b causes the controller 106 to add the product to a shopping cart associated with the business. In one embodiment, the second active area 352 is used to expedite delivery of the product and is not used to add the product to the custom order guide.

Figure 3B:
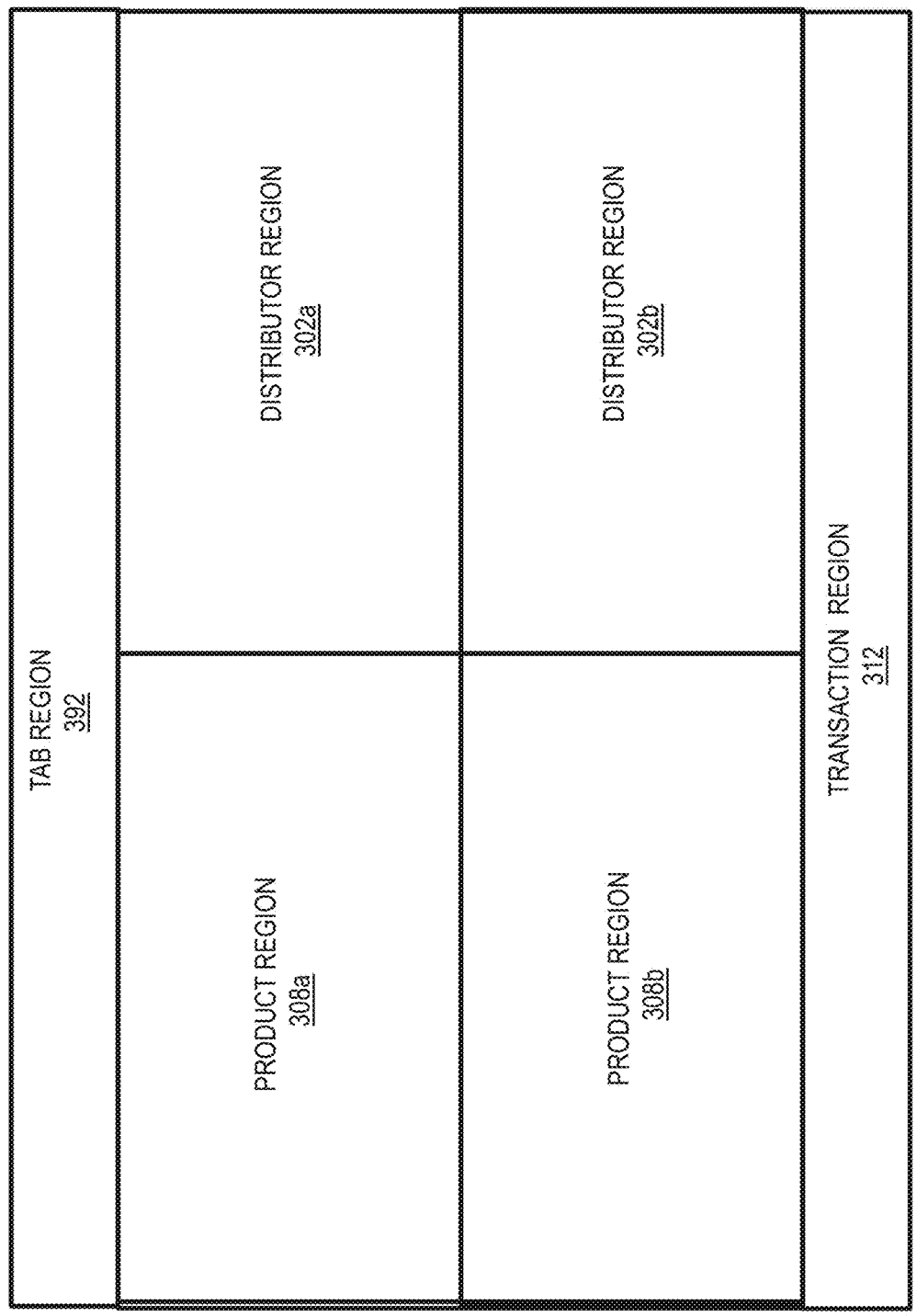
FIG. 3B is a block diagram that illustrates an example of an order guide view for displaying data related to the transaction of one or more products from one or more distributors, according to an embodiment.

FIG. 3B is a block diagram that illustrates an example of an order guide view 300 for displaying data related to the transaction of one or more products from one or more distributors, according to an embodiment. In some embodiments, after the business 105 selects one or more products from the view 350 of search items (e.g. by selecting the first active area 352a) and after one or more distributors 103 selling the product confirm the relationship request sent by the controller 106, the product is added to the customized order guide and displayed in the order guide view 300. In some embodiments, the order guide view 300 is presented on the display 108 and is viewed by a representative of the business 105 when performing a transaction through the system 100.

As depicted in FIG. 3B, the order guide view 300 includes a first product region 308a that includes data related to a first product in the customized order guide and a first distributor region 302a that includes data related to one or more distributors that sell the first product. In an embodiment, the one or more distributors of the first distributor region 302a have each confirmed the relationship request with the business. The order guide view 300 also includes a second product region 308b that includes data related to a second product in the customized order guide and a second distributor region 302b that includes data related to one or more distributors that sell the second product. Although FIG. 3A depicts two product regions 308a, 308b and two distributor regions 302a, 302b, the order guide view 300 is not limited to two product regions and two distributor regions and includes more than two product regions and more than two distributor regions. Additionally, as depicted in FIG. 3B, the order guide view 300 includes a transaction region 312 that includes data related to the transaction of one or more products from one or more distributors (e.g. delivery date, total price, amount saved, minimum price of each distributor, etc). Additionally, as depicted in FIG. 3B, the order guide view 300 includes a tab region 392 that includes one or more tabs that are used to categorize the products listed in the product region 308. In some embodiments, the product regions 308 are presented on a left side of the view 300, the distributor regions 302 are presented on a right side of the view 300, the tab region 392 is presented above the product regions 208 and distributor regions 302 and the transaction region 312 is presented below the product regions 308 and distributor regions 302. FIG. 3K is an image that illustrates an example of the tab region 392 of the order guide view 300 of FIG. 3B, according to an embodiment. The tab region 392 includes a plurality of tabs 394 that are used to categorize the products listed in the product regions 308 of the order guide view 300. This advantageously permits the business 105 to quickly access a particular order guide view 300 for a specific category of products, by selecting one of the tabs 394 in the tab region 392. Another advantage of this feature is that by limiting the order guide view 300 to products of a specific category, the number of products (e.g. number of product regions 308) in the guide view 300 does not become excessively large. In one embodiment, the tabs 394 include a collective tab 394a (e.g. "items") for all products. In another embodiment, the tabs 394 include specific tabs 394b (e.g. "food", "produce", "beverages", etc.) that categorize the products listed in the order guide view. In still other embodiments, the tabs 394 can include main categories for products and additional tabs for sub-categories within each main category (e.g. "meat" sub-category within "food" main category, etc). Additionally, the tab region 392 includes a plurality of active areas 396 that perform various functions when selected, including a first active area 396a (e.g. "search order guide") that brings up a search field to search the order guide when selected and a second active area 396b (e.g. "add item") that presents a search field for entering identifying criteria for one or more products to add to the order guide.

Figure 3C:
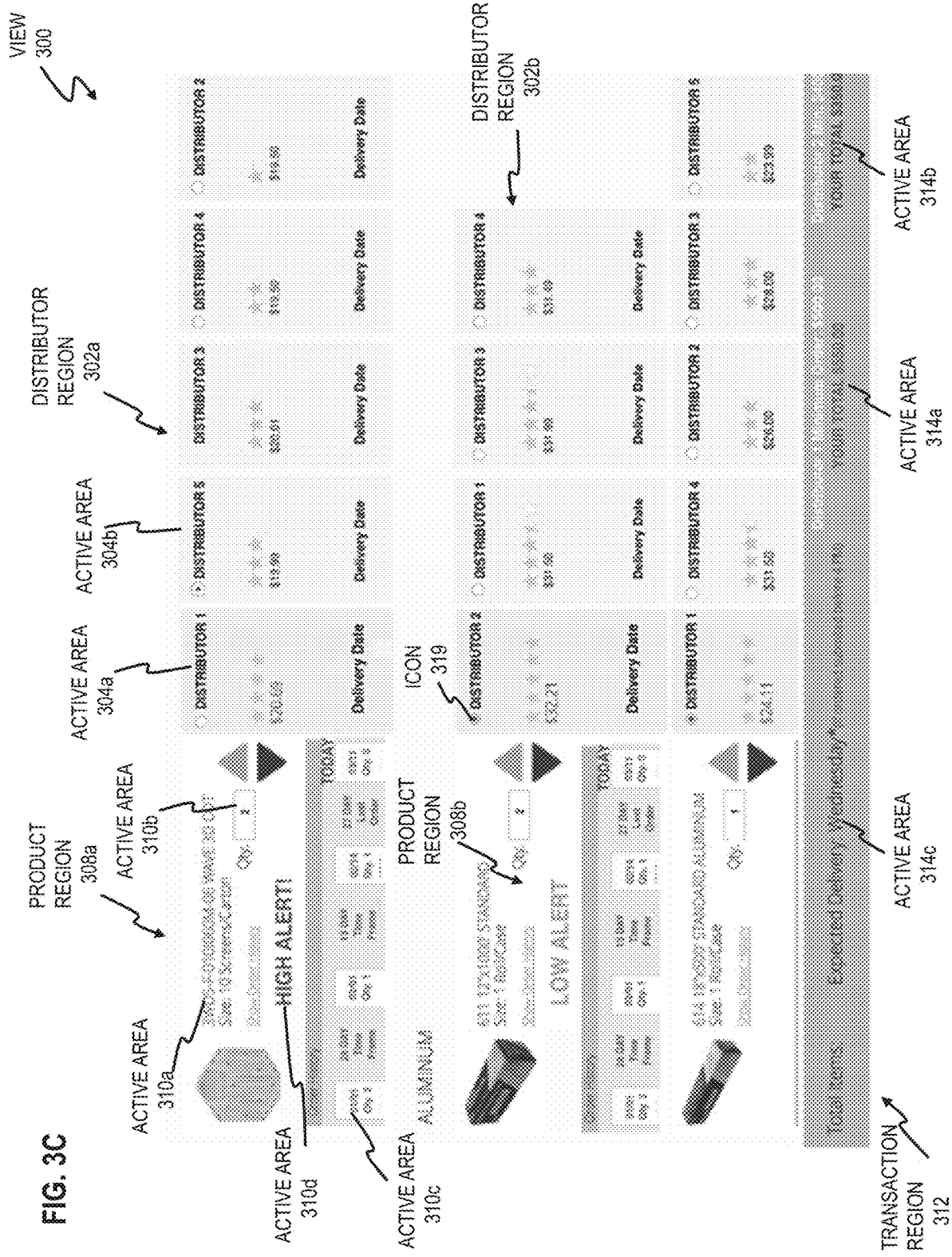
FIG. 3C is an image that illustrates an example of the order guide view of FIG. 3B, according to an embodiment.

FIG. 3C is an image that illustrates an example of the order guide view 300 of FIG. 3B, according to an embodiment. In some embodiments, the first distributor region 302a includes a plurality of active areas 304a, 304b where each active area 304 is associated with a respective distributor that sells the first product. In one embodiment, each active area 304 includes data associated with the first product sold by each distributor including the distributor name, a review score, a price and a location of the distributor. In an example embodiment, the controller 106 retrieves this data from fields 208, 210, 212, 214 of each record 202 in the data structure 200 corresponding with the first product.

In an embodiment, the plurality of active areas 304 in the first distributor region 302a are sorted or ranked based on one or more criteria including an order history of the first product between the business and the respective distributor; an average review score of the first product sold by the respective distributor; a price of the first product sold by the respective distributor and a location of the respective distributor (e.g. delivery date to the business). In an example embodiment, the plurality of active areas 304 in the first distributor region 302 are sorted or ranked based on the following criteria, weighted from highest to lowest: order history, average review score, price and location. In an example embodiment, the controller 106 retrieves the order history from field 232 of the record 222 associated with the business. In some embodiments, as depicted in FIG. 3C, one or more criteria are presented or displayed in each active area 304 including the average review score (e.g. number of stars on 5-star scale), the location (e.g. delivery date) and the price (e.g. in dollars and cents). In other embodiments, the active area 304 corresponding to the distributor with the best order history is aligned in a left column of the first distributor region 302a and is colored different than the other active areas 304. In an example embodiment, the active area 304 corresponding to the distributor with the best order history is colored green and the other active areas 304 are colored yellow. The second distributor region 302b is arranged in a similar manner as the first distributor region 302a, where the active areas in the second distributor region 302b are associated with a respective distributor that sells the second product.

In some embodiments, the first product region 308a includes a plurality of active areas 310a, 310b, 310c, 310d where each active area 310 is associated with the first product sold by the distributors in the first distributor region 302a. In one embodiment, a first active area 310a indicates a name of the first product. In an example embodiment, the controller 106 retrieves the name of the first product from field 204 of the record 202 associated with the first product. In another embodiment, a second active area 310b indicates a preferred quantity of the first product. Adjustment of the preferred quantity of the first product is performed by selection of up and down icons (e.g. using a mouse or other input device) in the first active area 310a.

In some embodiments, a third active area 310c includes data relating to one or more prior transactions of the first product between the business and the distributors in the first distributor region 302a. In some embodiments, the data related to one or more prior transactions is only displayed in the third active area 310c if the data indicates a pattern in the data relating to the one or more prior transactions. In one embodiment, the pattern is established by determining a length of time between consecutive prior transactions and evaluating whether the lengths of time between the consecutive prior transactions are within a threshold of each other. In an example embodiment, the threshold is in ±10%. In another example embodiment, the threshold is ±5%. In another example embodiment, the threshold is in a range from ±5%. to ±20%. In an example embodiment, the data pertaining to the plurality of prior transactions includes dates of the prior transactions and a length of time between the prior transactions. In some embodiments, if the data related to the prior transactions indicates the pattern and if today's date is consistent with the pattern, a row of third active areas 310c is alerted using an indicator. Advantageously, this alert indicator will make the row of third active areas 310c in the product region 308a look visually distinct from another row of active areas 310c in a different product region 308 where there is no established pattern in the prior transaction data. In an example embodiment, the alert is "high" or "low" based on whether placement of the order on today's date is consistent (e.g. alert is "high") or inconsistent (e.g. alert is "low") with the data pertaining to the plurality of prior transactions. In other embodiments, the alert is color coded so that the row of active areas 310c has a first color (e.g. red) or a second color (e.g. yellow) if no alert is present. In still other embodiments, the alert is placed in all-caps and with an exclamation point (e.g. "HIGH ALERT!"). In still other embodiments, the alert is color coded and placed in all-caps (e.g. "HIGH ALERT!" in red for high alert, "LOW ALERT" in yellow for low alert). In an example embodiment, if the data pertaining to the plurality of prior transactions indicated that the prior transactions took place on a certain calendar date (e.g. $17^{th}$ of the month) of preceding months and today's date is within a threshold (e.g. 2 days) of the length of time (e.g. 30 days) between transactions, the row of active areas 310c is alerted. If today's date is not within the threshold (e.g. 2 days) of the calendar date, the row of active areas 310c is not alerted.

In some embodiments, upon moving an icon (e.g. mouse icon) over one of the active areas 310c for a minimum time period, further data pertaining to the prior transactions is presented on the display including one or more of the distributor, date, quantity, price, delivery date and total amount.

Figure 3D:
FIG. 3D is an image that illustrates an example of an order history view for displaying data related to an order history between the business and the distributors in FIG. 3C, according to an embodiment.
Figure 3D:
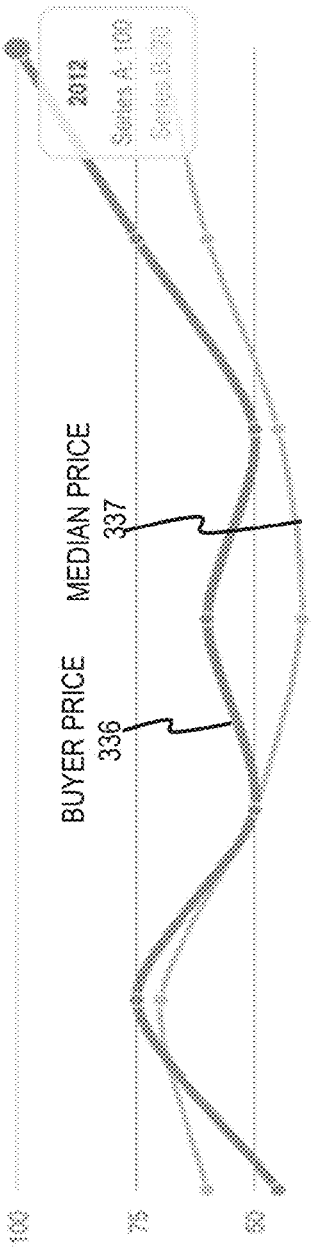
Figure 3D:
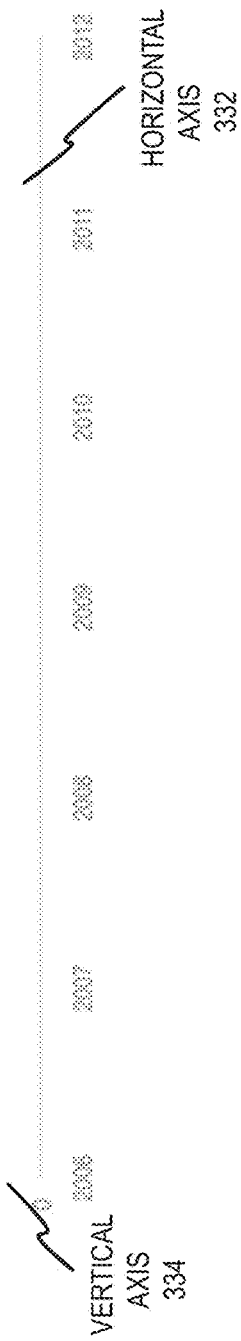

In some embodiments, upon selecting one of the active areas 310 with an input device (e.g. mouse), a graph of the order history of the first product between the business and the distributors in the distributor region 302 is presented on the display. In an example embodiment, upon selecting the active area 310a, the graph is presented on the display. FIG. 3D is an image that illustrates an example of an order history view 320 for displaying data related to an order history between the business and the distributors in the distributor region 302, according to an embodiment. The order history view 320 includes a graph 330 with a horizontal axis 332 of time in units of calendar years and a vertical axis 334 of price of the first product in units of dollars. The graph 330 includes a first trace of the price 336 of the first product paid by the business to the distributors over time and a second trace of a median price 337 of the first product paid by all businesses to all distributors over time. The graph 330 advantageously allows the business to quickly determine whether the price 336 paid over time (and currently) is below or above the average price 337 paid by other businesses for the same product over time. In some embodiments, the graph 330 is generated after selecting the active area 310 and further selecting a tab 322a (e.g. "price history" tab) in the view 320.

FIG. 3E is an image that illustrates an example of a distributor view 340 for displaying a list of distributors that sell a designated product in FIG. 3C, according to an embodiment. In one embodiment, the distributor view 340 is presented on the display 108 by selecting the tab 322b (e.g. "distributors") in the view 320 of FIG. 3D. Upon selecting the tab 322b, a list of the distributors is presented that sell the first product. In one embodiment, the list of distributors coincides with the distributors in each active area 304 of the first distributor region 302a. In another embodiment, the distributor view 340 includes an active area (e.g. "view" icon). Upon selection of the active area (e.g. "view" icon) associated with one of the distributors, data regarding the distributor is output on the display 108. In an example embodiment, the data output on the display 108 includes data from one or more of fields 208, 210, 212, 214 from records 202 associated with the first product.

In some embodiments, to place an order, the representative of the business 105 selects a particular distributor from each distributor region 302a, 302b, such that the selected distributor from each distributor region 302a, 302b is the designated source of the respective product. In an example embodiment, as depicted in FIG. 3C, the representative of the business selected "Distributor 5" as the particular distributor to provide the business with the first product and selected "Distributor 2" as the particular distributor to provide the business with the second product. As depicted in FIG. 3C, in one embodiment, the particular distributor in each distributor region 302 is selected by clicking the icon 319 adjacent a name of the particular distributor. In other embodiments, the particular distributor in each distributor region 302 is selected using other means, such as clicking the name of the particular distributor. Although FIG. 3C depicts that the distributor active areas 304 are horizontally aligned in the distributor regions 302, in other embodiments, the active areas 304 are vertically aligned in the distributor region 302.

The transaction region 312 of FIG. 3C includes multiple active areas 314a, 314b, 314c that include data related to the transaction of one or more products from the one or more particular distributors. In one embodiment, a first active area 314a includes a total price based on a desired quantity (e.g. based on the active area 310b) of the first product and a unit price of the first product provided by the particular distributor (e.g. "Distributor 1") of the first distributor region 302a. Additionally, in one embodiment, the first active area 314a includes a minimum order amount that is required by the particular distributor (e.g. $500). In one embodiment, if the total price in the first active area 314a is equal to or greater than the minimum order amount, the total price indicates that the total price satisfies the minimum order amount. In an example embodiment, where the total price is equal to or exceeds the minimum order amount, the total price is color coded green.

In another embodiment, the second active are 314b includes a total price based on a desired quantity of the second product and a unit price of the second product provided by the particular distributor (e.g. "Distributor 2") of the second distributor region 302b. Additionally, in one embodiment, the second active area 314b includes a minimum order amount that is required by the particular distributor (e.g. $400). In one embodiment, if the total price in the second active area 314b is less than the minimum order amount, the total price indicates that the total price does not yet satisfy the minimum order amount. In an example embodiment, where the total price is less than the minimum order amount, the total price is color coded red.

Figure 3F:
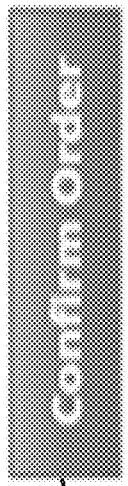
FIG. 3F is an image that illustrates an example of a grand total and amount saved displayed in the order guide view, according to an embodiment.

FIG. 3F is an image that illustrates an example of a grand total and amount saved displayed in the order guide view 300, according to an embodiment. In another embodiment, the transaction region 312 includes a fourth active area 314d that includes a total price of all products purchased from all distributors. In some embodiments, the total price is based on the desired quantity of each product (e.g. based on active area 310b) and the unit price of each product sold by the particular distributor that is designated as the source of the product. In an additional embodiment, the transaction region 312 includes a fifth active area 314e that includes an amount saved based on a difference between a maximum total that is based on the desired quantity of each product and a maximum price of each product among all distributors and the total price in the fourth active area 314d. In another embodiment, the transaction region 314 includes a sixth active area 314f (e.g. a "confirm order" clickable icon) that confirms the order upon selection of the sixth active area 314f.

In some embodiments, upon the business confirming the order, the controller 106 transmits a signal to the external payment provider 113 including the token (e.g. field 236 data), the transaction amount and the name of the distributor 103. In response, the external payment provider 113 processes the payment information of the business 105 for the transaction amount and transfers the amount to an account for the distributor 103 at the external payment provider 103. The external payment provider 113 then transmits a signal to the controller 106 with a payment confirmation number for the transaction. In these embodiments, the controller 106 then sends separate signals to separate distributors 103a, 103b over the network, where each signal includes transaction data with the desired quantity of the product from the distributor, the payment confirmation number of the transaction from the external payment provider 113 and the delivery date and the business location. The confirmation number of the transaction advantageously confirms to the distributor 103 that funds have been transferred to the distributor 103 account with the external payment provider 113. In other embodiments, where the external payment provider 113 is not used, the signal further includes the payment information of the business 105 so that the distributor 103 can process the payment. In other embodiments, the controller 106 processes the payment information of the business 105 and subsequently transmits an electronic payment to the distributor 103 in the amount of the transaction.

In some embodiments, upon the business confirming the order, the controller 106 transmits an invoice including the transaction information (e.g. desired quantity of the product, unit price of the product, payment confirmation number of the transaction from external payment provider 113, delivery date, business location, etc). In the event that the business 105 wants a refund, the controller 104 generates a signal through the network to the controller 106 requesting the refund. In this embodiment, upon receiving the refund request signal, the controller 106 transmits a signal to the distributor 103 to alert the distributor 103 that the business 105 is requesting a refund. If the distributor 103 approves of the refund, a reply signal is transmitted to the controller 106 approving of the refund and the controller 106 transmits a signal to the external payment provider 113 to refund or credit back the account of the business 105 for the transaction amount.

In another embodiment, as depicted in FIG. 3C, the transaction region 312 includes a third active area 314c that indicates an estimated date of delivery of the one or more products. In some embodiments, the third active area 314c includes multiple estimated dates of delivery, including a respective date of delivery for a respective distributor that is designated as the source for a respective product.

Figure 3G:
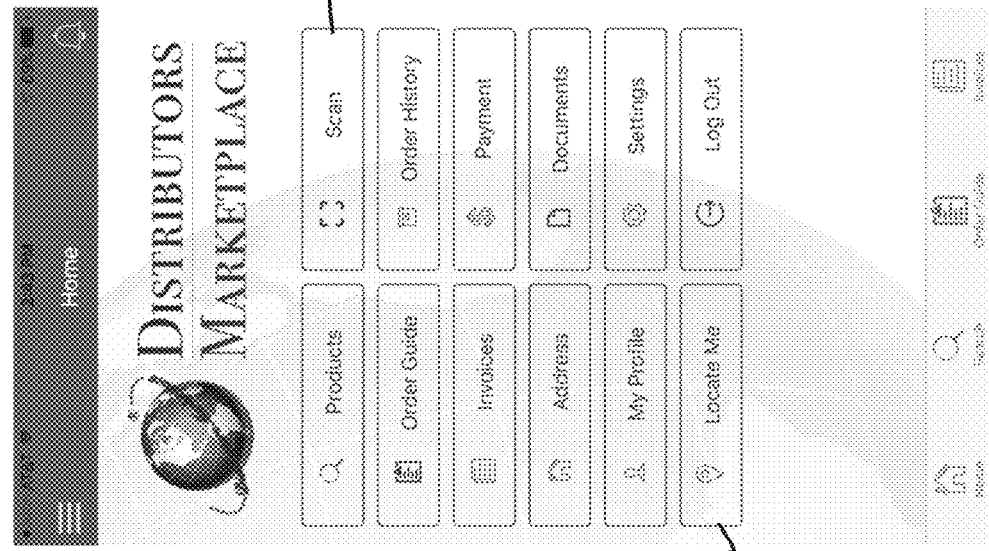
FIG. 3G is an image that illustrates an example of a view of a log-in screen of the system on a mobile device, according to an embodiment.

FIG. 3G is an image that illustrates an example of a view 360 of a log-in screen of a mobile device connected to the system 100, according to an embodiment. In one embodiment, the log-in screen includes fields for a username and password. In some embodiments, either a business 105 or a distributor 103 can both log-in through the log-in screen and sign up with the system 100. In one embodiment, the log-in screen includes active areas to open an account with the system 100 ("sign up") and another active area to log into the system 100 once the user name and password are entered ("login").

Figure 3H:
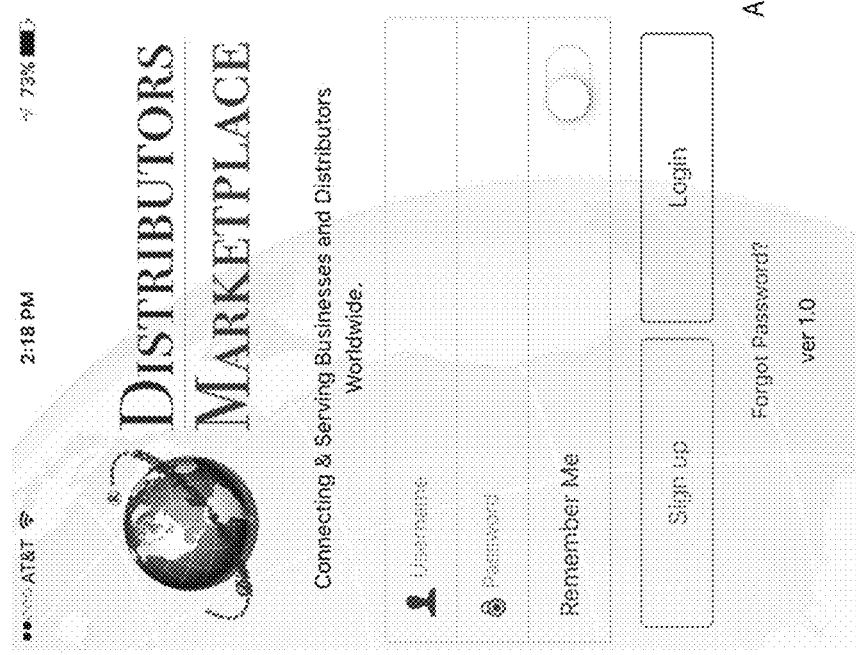
FIG. 3H is an image that illustrates an example of a view of a main menu of the system on a mobile device, according to an embodiment.
Figure 3J:
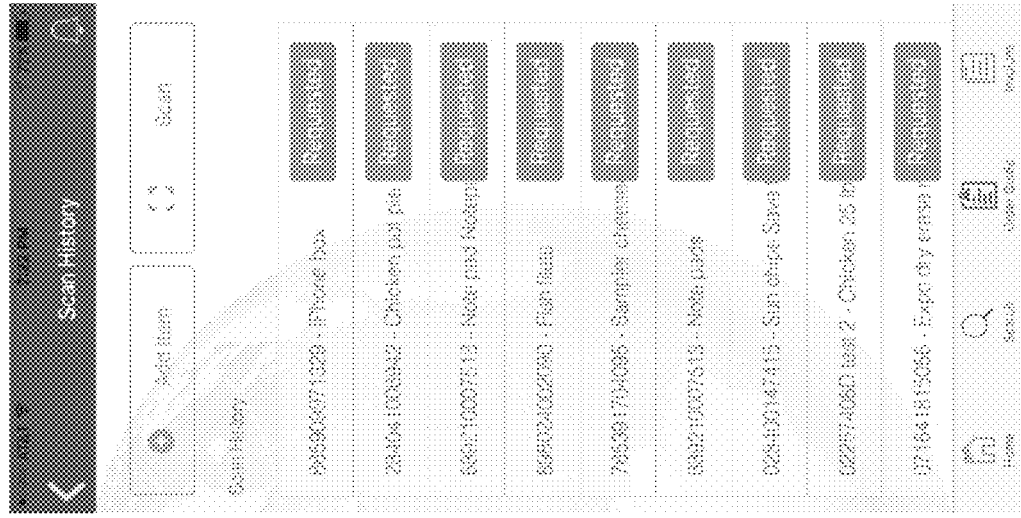
FIG. 3J is an image that illustrates an example of a view of a scan feature of the system on a mobile device, according to an embodiment.

FIG. 3H is an image that illustrates an example of a view 370 of a main menu of the system 100 on a mobile device, according to an embodiment. In one embodiment, the view 370 of the main menu includes multiple active areas that perform various steps and features. In one embodiment, upon selecting a "products" active area, the business representative is brought to a search screen where they can enter identifying criteria of one or more products that the business 105 is interested in purchasing from distributors 103. In another embodiment, upon selecting a "scan" active area 372b, a scan feature of the mobile phone is activated and the business representative can use the mobile phone to scan the identifying criteria (e.g. UPC) of multiple products at the business which the business is interested in purchasing from distributors over the system 100. In this embodiment, upon scanning the identifying criteria of each product, the controller 106 receives the scanned identifying criteria, determines one or more products associated with the received identifying criteria and transmits a signal to one or more distributors 103 that sell the one or more products to request a relationship with the business 105. In an example embodiment, the controller 106 uses the inputted scanned identifying criteria to search the second field 206 of each record 202, to identify the products (e.g. first field 204 data of matching records 202) and distributors (e.g. third field 208 data of matching records 202). This embodiment advantageously instantly initiates the relationship request between the business 105 with one or more distributors 103 by the business representative simply scanning one or more products at the business 105 location. Thus, this feature makes it easier for the business 105 to initiate transactions with distributors 103 over the system 100. FIG. 3J is an image that illustrates an example of a view 390 of a scan feature of the system 100 on a mobile device, according to an embodiment. As depicted in FIG. 3J, for each scanned product, an active area is displayed that indicates whether a relationship request has been sent to one or more distributors that sell the scanned product. In an example embodiment, the "requested" active area indicates that for each of the scanned products, a relationship request has been sent to one or more distributors that sell the scanned product.

Figure 3I:
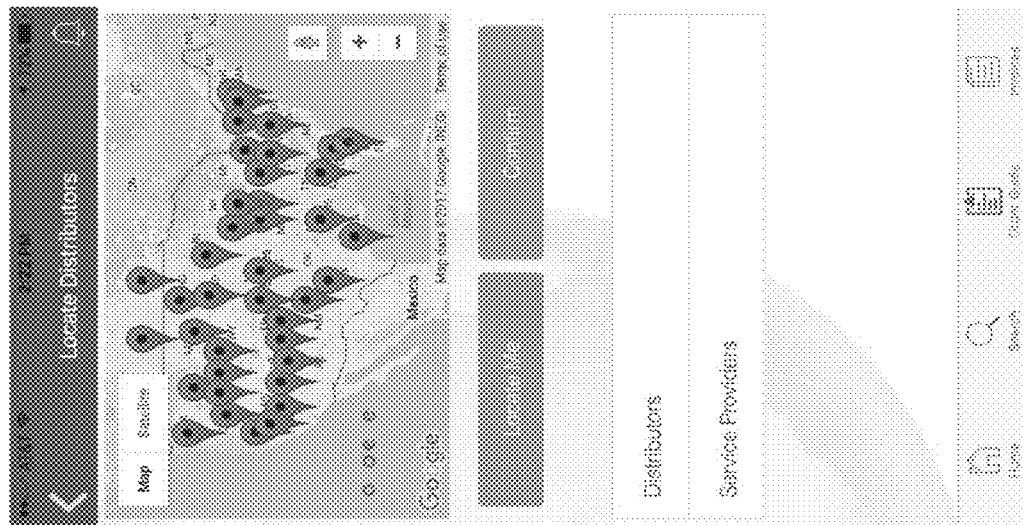
FIG. 3I is an image that illustrates an example of a view of a locate feature of the system on a mobile device, according to an embodiment.

In another embodiment, upon selecting a "locate me" active area 372a in the main menu 370, a locate feature (e.g. GPS) of the mobile phone is activated and the business representative can use the mobile phone to locate one or more distributors 103 that ship products to a geographic region (e.g. zip code) corresponding to the business location. This locate feature advantageously permits the business representative to instantly determine how many distributors 103 registered with the system 100 are registered to ship products to the business location. In one embodiment, the locate feature is industry specific or product specific and thus the located distributors are specific to the industry or specific to offering the products sought (e.g. scanned) by the business. FIG. 3I is an image that illustrates an example of a view 380 of a locate feature of the system 100 on a mobile device, according to an embodiment.

Figure 4B:
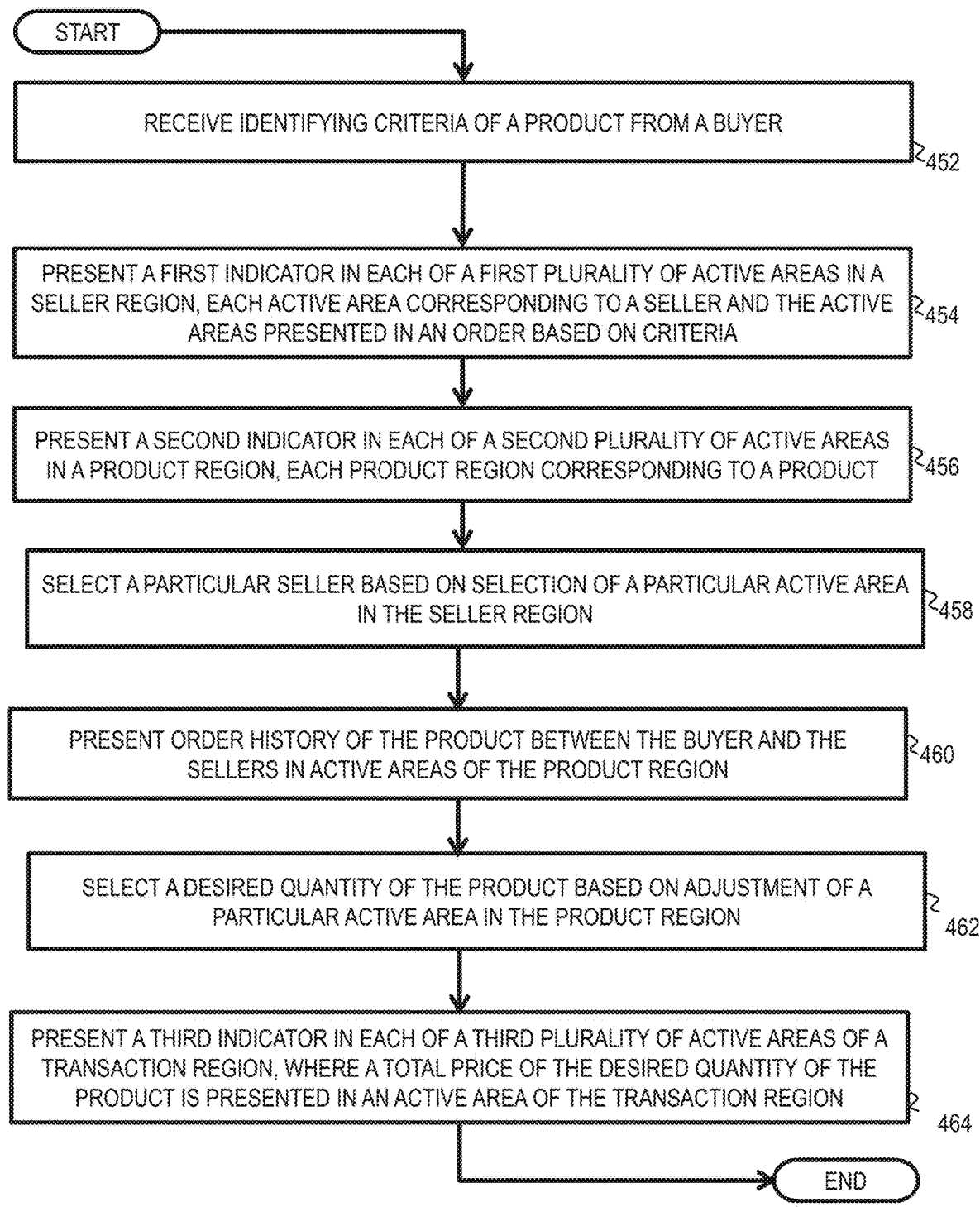
FIG. 4B is a flow diagram that illustrates an example of a method for displaying data related to a transaction of one or more products from one or more distributors, according to an embodiment.

Although steps are depicted in FIGS. 4A-4B, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

FIG. 4A is a flow diagram that illustrates an example of a method 400 for displaying data relating to a transaction of one or more products from one or more distributors 103 by the business 105. In step 402, the identifying criteria of the product is input by the business 105 (via. controller 104) and received at the controller 106. In one embodiment, the identifying criteria (e.g. search term, UPC, SKU, etc.) is input by a representative of the business 105 using an input device (e.g. keyboard on a computer or touchscreen on a mobile device) connected with the controller 104, so that the identifying criteria is transmitted to the controller 106.

In other embodiments, in step 402, the representative of the business 105 inputs one or more criteria of the business over the network to the controller 106. In one embodiment, the criteria of the business includes one or more of the name of the business, verification information of the business (e.g. business license, tax identification, etc.), an industry of the business, an annual revenue of the business, an order history between the business 105 and one or more distributors 103, a location of the business and payment information (e.g. token from the external payment provider 113) of the business. In one embodiment, after the controller 106 receives the criteria of the business 105, the criteria are verified. In an example embodiment, a representative of the marketplace controller 106 verifies the criteria of the business (e.g. verify business license using government records, etc.). In an embodiment, the controller 106 updates the fields 224, 226, 228, 230, 232, 234, 236 of the record 222 of each business after receiving the criteria.

In step 404, one or more products are determined that correspond to the inputted identifying criteria in step 402. In one embodiment, in step 404, the one or more products are retrieved from a memory of the controller 106. In this embodiment, in step 404, the one or more products are retrieved from the memory of the controller 106, by searching the memory of the controller using the inputted identifying criteria from step 402. In another embodiment, in step 402, the controller 106 searches the fields 206 of all records 202 with the inputted identifying criteria from step 402. In this embodiment, the field 204 of the matching records 202 indicates the one or more products corresponding to the inputted identifying criteria.

In step 406, one or more distributors are determined of the products determined in step 404. In one embodiment, in step 406, the one or more distributors are retrieved from a memory of the controller 106. In this embodiment, in step 406, the one or more distributors are retrieved from the memory of the controller 106, by searching the memory of the controller using the products determined in step 404. In another embodiment, in step 406, the field 208 of the matching records 202 in step 404 includes data indicating the one or more distributors that sell the products.

In some embodiments, in step 406, the controller 106 transmits the relationship request signal to the one or more distributors 103 (i.e. to the distributor controllers 102), where the signal includes the business criteria obtained in step 402. Upon receiving the relationship request signal from the controller 106, the distributors 103 review the criteria of the business 105 and determine whether or not to transact business with the business 105. In an example embodiment, the distributor 103 determines whether the location of the business 105 is within a delivery area of the distributor 103. In another example embodiment, the distributor 103 determines whether the industry of the business is within the industry of the distributor 103. In another example embodiment, the distributor 103 determines whether the annual revenue of the business 103 exceeds an annual revenue threshold that the distributor 103 requires in order to transact business. If the distributor 103 accepts a relationship with the business 105, the controller 102 transmits a confirmation signal to the controller 106 which is received at the controller 106 to confirm the relationship request. Upon receiving the relationship request from each distributor 103, the controller 106 is configured to permit the business 105 to add products sold by each distributor 103 to the custom order guide 300.

In step 408, the one or more distributors determined in step 406 are presented for each of the products determined in step 404. In one embodiment, the distributors are presented in an order based on one or more criteria. In one embodiment, the criteria includes the order history of the product between the business and the respective distributor; an average review score of the product sold by the respective distributor; a price of the product sold by the respective distributor and a location of the respective distributor. In an example embodiment, the order of the distributors is presented based on the order guide view 300, where the order of the active areas 304 in the distributor region 302 is based on one or more of the criteria.

In step 410, a particular distributor is selected from the distributors presented in step 408. Additionally, in step 410, a particular quantity of each product is selected. In one embodiment, the particular distributor in the order guide view 300 is selected among the presented distributors in the region 302, by selecting one of the active areas 304 in the distributor region 302. In an example embodiment, the active area 304 is selected using the icon 319 adjacent a name of the particular distributor that the business 105 chooses as the source of the particular product. Additionally, in an example embodiment, the particular quantity of the product is selected by adjusting the quantity in the active area 310b in the product region 308. In an example embodiment, the particular quantity of the product is adjusted by selecting up and down arrows with an input device (e.g. mouse) until the desired quantity is displayed for the particular product. In some embodiments, step 410 is repeated for each product that the business 105 wants to add to the transaction and thus for each product listed in the order guide view 300.

In step 412, a total price of the particular quantity of each product is presented in the order guide view 300. In some embodiments, the total price is itemized for each distributor 103, as depicted in active areas 314a, 314b. In these embodiments, the itemized price for each distributor includes a minimum order for each distributor and an indicator (e.g. coloring of the total amount) of whether the itemized price is equal to or greater than the minimum order. In other embodiments, in step 412, the total price for the particular quantity of all products from all particular distributors selected in step 410 is presented in the order guide view 300. In some embodiments, this total price is depicted in active area 314d. In other embodiments, an amount saved is also presented in the active area 314e and is based on a difference between a maximum total price (e.g. based on the particular quantity of each product and a maximum price among all distributors) and the total price in active area 314d.

In other embodiments, in step 412, an order history between the business 105 and the distributors in the distributor region 302 is presented in the order guide view 300. In one embodiment, the order history is presented in active areas 310c of the product region 308. In an example embodiment, the active areas 310c include data pertaining to prior transactions between the business 105 and the distributors in the distributor region 302. In an example embodiment, the active areas 310c include dates of one or more of the prior transactions and a length of time between the dates of the one or more prior transactions. In one embodiment, the order history is only presented in the order guide view 300, if a pattern is determined in the data related to the prior transactions. Additionally, in other embodiments, in step 412, if the pattern is determined in the prior transaction data and if today's date is consistent with the pattern, an alert is presented in the product region 308. In one embodiment, the order history is hidden by default but is presented if the alert is presented in active area 310d. In yet another embodiment, the order history is displayed when an active area (e.g. "history") in the product region 308 is selected.

In other embodiments, in step 412, the business can confirm the transaction by selecting one or more active areas in the order guide view 300. In one embodiment, the active area 314f (e.g. "confirm order") is selected by the business 105 to initiate the transaction. In some embodiments, upon confirming the transaction, the controller 106 transmits a signal to the external payment provider 113 with the token and the transaction amount and receives a payment confirmation number once the external payment provider 113 processes the payment information of the business 105 for the transaction amount. The controller 106 then transmits respective signals to each particular distributor 103 selected in step 410, where the respective signal includes one or more of the particular quantity of the product, the payment confirmation number from the external payment provider 113, the price of the product, the total amount of the particular quantity of products from the distributor 103 (including shipping and tax), a delivery date of the products to the business 105 and information pertaining to the business 105 (e.g. location, etc). In some embodiments, upon confirmation of the transaction between the business 105 and each distributor 103, the controller 106 updates data in the fifth field 232 of the record 222 corresponding to the business 105, so that the order history of the business 105 is updated to include the confirmed transaction.

FIG. 4B is a flow diagram that illustrates an example of a method 450 for displaying data relating to a transaction of a one or more products from one or more distributors 103 by the business 105. Step 452 is similar to step 402. In step 454, an indicator is presented in each active area 304 of the distributor region 302, where each active area 304 corresponds to a respective distributor. In some embodiments, the active areas 304 within the distributor region 302 are presented in an order based on one or more criteria (e.g. order history, review score, price, location, etc.) as previously discussed. Although FIG. 3C depicts the active areas 304 presented with a horizontal alignment in the distributor region 302, the distributor region 302 is not limited to this arrangement and includes any alignment (e.g. vertical) of the active areas 304.

In step 456, an indicator is presented in each active area 310 in the product region 308, where each product region 308 corresponds to a respective product that the business 105 wants to purchase from distributors 103 using the system 100. In some embodiments, the active area 310a includes a title of the product. In other embodiments, the active area 310b includes a desired quantity of the product. In other embodiments, the active area 310c includes data pertaining to prior transactions of the product between the business 105 and the distributors in the distributor region 302. In another embodiment, the active area 310d includes an alert to indicate to the business 105 whether ordering the product on today's date is consistent with the prior transaction data in the active area 310c.

In step 458, a particular distributor is selected in the distributor region 302 by selecting a particular active area 304. In some embodiments, the selection of the particular active area 304 is done by selecting an icon 319 adjacent to a name of the particular distributor with an input device (e.g. mouse, touchscreen). In an embodiment, the business 105 selects the particular distributor by considering one or more of the criteria (e.g. order history, review score, price, location) that were used to sort the distributors in the distributor region 302.

In step 460, an order history between the business 105 and the distributors in the distributor region 302 is presented in the order guide view 300. In some embodiments, the order history is presented in an active area 310 of the product region 308. In an example embodiment, the order history is presented in active areas 310c that include data pertaining to multiple prior transactions between the business 105 and the distributors for the product.

In step 462, the desired quantity of the product is selected. In one embodiment, the desired quantity of the product is selected by adjusting an active area 310 within the product region 308. In an example embodiment, the desired quantity of the product is selected by adjusting up and down arrows in the active area 310b until a displayed quantity in the active area 310b is the desired quantity.

In step 464, an indicator is presented in each active area 314 of the transaction region 312 of the order guide view 300. In one embodiment, a total price of the desired quantity of the product is presented in the active area 314, where the total price is based on the desired quantity of the product and the unit price of the product offered by the distributor. In some embodiments, the total price is presented in active area 314d and is a total price of the desired quantity of all products from all particular distributors selected in step 458. In other embodiments, the total price is presented in active area 314a, 314b, and is an itemized price of the desired quantity of the product from one distributor.

In other embodiments, in step 464, a delivery date is presented in the active area 314c that indicates the delivery date of the desired quantity of the products to the business 105. In some embodiments, a single delivery date is presented in the active area 314c, where each distributor selected in step 458 estimates the same delivery date. In other embodiments, multiple delivery dates are presented in the active area 314c, where the distributors selected in step 458 estimate different delivery dates.

In other embodiments, the controller 106 searches the fifth field 232 data (e.g. order history) for each record 202 (e.g. each business 105) to determine a geographical scope and time scope of the order history of the transactions placed by the businesses 105. In these embodiments, the controller 106 subsequently transmits a signal to the distributors 103 where the signal indicates the geographic scope and time scope of the order history of the businesses 105. This feature advantageously permits the system 100 to inform the distributors 103 about the quantity (e.g. number of businesses 105), geographic scope and time scope of transactions for products offered by the distributors 103. In an example embodiment, this information may incentivize one or more distributors 103 to offer products in geographical areas previously not offered.

2. Hardware Overview

FIG. 5 is a block diagram that illustrates a computer system 500 upon which an embodiment of the invention may be implemented. Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit).). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of one or more methods described herein.

A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitutes computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

Information, including instructions, is provided to the bus 510 for use by the processor from an external input device 512, such as a keyboard containing alphanumeric keys operated by a human user, or a sensor. A sensor detects conditions in its vicinity and transforms those detections into signals compatible with the signals used to represent information in computer system 500. Other external devices coupled to bus 510, used primarily for interacting with humans, include a display device 514, such as a cathode ray tube (CRT) or a liquid crystal display (LCD), for presenting images, and a pointing device 516, such as a mouse or a trackball or cursor direction keys, for controlling a position of a small cursor image presented on the display 514 and issuing commands associated with graphical elements presented on the display 514.

In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 570 sends and receives electrical, acoustic or electromagnetic signals, including infrared and optical signals, that carry information streams, such as digital data.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 502, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 502, except for carrier waves and other signals.

Logic encoded in one or more tangible media includes one or both of processor instructions on a computer-readable storage media and special purpose hardware, such as ASIC *520.

Network link 578 typically provides information communication through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides information representing video data for presentation at display 514.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520, may be used in place of or in combination with software to implement the invention. Thus, embodiments of the invention are not limited to any specific combination of hardware and software.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server 592 transmits program code for a particular application, requested by a message sent from computer 500, through Internet 590, ISP equipment 584, local network 580 and communications interface 570. The received code may be executed by processor 502 as it is received, or may be stored in storage device 508 or other non-volatile storage for later execution, or both. In this manner, computer system 500 may obtain application program code in the form of a signal on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set 600 upon which an embodiment of the invention may be implemented. Chip set 600 is programmed to perform one or more steps of a method described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of a method described herein.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 605 also stores the data associated with or generated by the execution of one or more steps of the methods described herein.

FIG. 7 is a diagram of exemplary components of a mobile terminal 700 (e.g., cell phone handset) for communications, which is capable of operating in the system of FIG. 2C, according to one embodiment. In some embodiments, mobile terminal 701, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps as described herein. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 as described herein. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

In some embodiments, the mobile terminal 701 includes a digital camera comprising an array of optical detectors, such as charge coupled device (CCD) array 765. The output of the array is image data that is transferred to the MCU for further processing or storage in the memory 751 or both. In the illustrated embodiment, the light impinges on the optical array through a lens 763, such as a pin-hole lens or a material lens made of an optical grade glass or plastic material. In the illustrated embodiment, the mobile terminal 701 includes a light source 761, such as a LED to illuminate a subject for capture by the optical array, e.g., CCD 765. The light source is powered by the battery interface and power control module 720 and controlled by the MCU 703 based on instructions stored or loaded into the MCU 703.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

What is claimed is:

1. A method comprising:
   providing, in a memory of a processor of a computer, a first data structure having a plurality of records and wherein each record includes a first field for holding data indicating a product, a second field for holding data indicating an identifying criteria of the product and a third field for holding data indicating a seller of the product;
   providing, in the memory of the processor, a second data structure, said second data structure having a plurality of records and wherein each record stores data of a buyer and includes a field for holding data indicating an order history comprising a number of prior transactions or units sold between the buyer and a seller of the product;
   inputting, using an input device of the computer, identifying criteria of a product;
   determining, with the processor, each record of the first data structure with the second field data corresponding to the inputted identifying criteria;
   presenting, on a display of the computer, a first view with an active area and data indicating the product corresponding to the inputted identifying criteria based on the first field of each record of the first data structure corresponding to the inputted identifying criteria;
   selecting, using the input device of the computer, the active area on the first view on the display corresponding to the product;
   determining, with the processor, a first plurality of sellers of the product corresponding to the selected active area in the first view, based on the third field data of the record of the first data structure corresponding to the product;
   transmitting, to the first plurality of sellers, a signal to request a relationship with the buyer;
   receiving, from a second plurality of sellers comprising one or more of the first plurality of sellers, a signal to confirm the relationship with the buyer;
   presenting, on the display, a second view different from the first view such that the first view is not presented on the display when the second view is presented on the display and the second view is not presented on the display when the first view is presented on the display, wherein the second view includes the second plurality sellers for the product, wherein the second plurality of sellers are presented in an order according to the order history from the field of the second data structure and wherein the second view further includes a plurality of active areas including data indicating the number of prior transactions or units sold between the buyer and the second plurality of sellers;
   in response to moving, with the input device, an icon on the second view of the display over one of the plurality of active areas for a minimum time period, modifying the second view on the display to present additional data regarding the number of prior transactions or units sold corresponding to the one of the plurality of active areas; and
   in response to a selection of a particular seller of the second plurality of sellers in the second view and a particular quantity for the product, presenting, in the second view a total price of the particular quantity for the product.

2. The method of claim 1, wherein each record of the first data structure further includes at least one of a fourth field for holding data indicating a review score of the product sold by the seller, a fifth field for holding data indicating a price of the product sold by the seller, and a sixth field for holding data indicating a location of the seller.

3. The method of claim 2, further comprising:
   receiving, on the processor, product data from each seller including at least one of data indicating each product sold by the seller, data indicating the identifying criteria of each product, data indicating the seller, data indicating the review score of each product, data indicating the price of each product and data indicating the location of the seller; and
   storing, in the first data structure, the product data in respective records including at least one of storing the data indicating the product in the first field, storing the identifying criteria data in the second field, storing the seller data in the third field, storing the review score data in the fourth field, storing the price data in the fifth field, and storing the location data in the sixth field.

4. The method of claim 1, wherein the second plurality of sellers are further presented in the order according to at least one of a review score of the product from each seller, a price of the product from each seller and a location of each seller.

5. The method of claim 4, wherein the second plurality of sellers are presented in the order according to the order history, the review score, the price and the location, wherein the order history, the review score, the price and the location are weighted from highest to lowest in the order of the order history, the review score, the price and the location.

6. The method of claim 1, wherein the determining the one or more sellers of the one or more products comprises:
receiving, on the processor, one or more criteria of the buyer;
verifying the one or more criteria of the buyer;
the transmitting the signal to the first plurality of sellers, wherein the signal to request the relationship with the buyer includes the one or more criteria of the buyer; and
the receiving the signal to confirm the relationship request from the second plurality of sellers.

7. The method of claim 6, further comprising storing, in the second data structure, the one or more criteria of the buyer, wherein the one or more criteria of the buyer includes at least one of business name, verification information, industry, annual revenue, order history between the buyer and the one or more seller, location and payment information.

8. The method of claim 7, each record of the second data structure stores data of each buyer and includes at least one of a first field for holding data indicating the business name, a second field for holding data indicating the verification information, a third field for holding data indicating the industry, a fourth field for holding data indicating the annual revenue, a fifth field for holding data indicating the order history, a sixth field for holding data indicating the location and a seventh field for holding data indicating the payment information.

9. The method of claim 1, wherein the presenting, on the display, the total price further includes presenting, on the display, a total amount saved based on a difference between a maximum total price determined using the seller with a maximum price for each of the one or more products and the total price.

10. The method of claim 1, wherein in response to selection of the active area on the first view on the display to confirm a transaction including the particular seller and the particular quantity for each of the one or more products, transmitting respective signals to each particular seller, wherein each signal includes data indicating the particular quantity of the respective product, a delivery date and one or more criteria of the buyer stored in the memory.

11. The method of claim 1,
wherein the selecting the active area on the first view comprises adding the one or more products to a customized order guide in response to selection of the one or more products by the buyer.

12. The method of claim 8, further comprising:
searching the fifth field data of the plurality of records of the second data structure to determine a geographical scope and time scope of the order history of each buyer of one or more products sold by a seller; and
transmitting a signal to the seller indicating the geographical scope and time scope of the order history of each buyer.

13. The method of claim 1, wherein the product is two or more products.

14. A method for displaying data relating to a transaction of one or more products from one or more sellers by a buyer, the method comprising:
providing, in a memory of a processor of a computer, a first data structure having a plurality of records and wherein each record includes a field for holding data indicating an identifying criteria of a product;
providing, in the memory of the processor, a second data structure, said second data structure having a plurality of records and wherein each record stores data of a buyer and includes a field for holding data indicating an order history comprising a number of prior transactions or units sold between the buyer and a seller of the product;
receiving, on the processor, identifying criteria of the one or more products from the buyer; presenting, on a display of the computer, a first view including a first indicator in each of a first plurality of active areas in a seller region, each active area in the seller region corresponding to a respective one of the one or more sellers, wherein the first plurality of active areas is displayed in an order based on the order history and wherein a respective seller region is displayed for each of the one or more products;
presenting, in the first view on the display, a second indicator in each of a second plurality of active areas in a product region different from the seller region, each product region corresponding to a respective one of the one or more products;
in response to a selection of a particular active area in each seller region, presenting, in the second plurality of active areas in the product region, the order history data of the product between the buyer and the one or more sellers in the seller region;
in response to moving, with an input device, an icon on the first view of the display over one of the second plurality of active areas for a minimum time period, modifying the first view on the display to present additional data regarding the number of prior transactions or units sold between the buyer and the one or more seller corresponding to the one of the second plurality of active areas; and
presenting, in the first view on the display, a third indicator in each of a third plurality of active areas in a transaction region different from the product region and the seller region, wherein in response to adjustment of a particular active area in the product region corresponding to a desired quantity of each product, presenting, in the third plurality of active areas in the transaction region, a total payment of the transaction of the desired quantity of the one or more products from each particular seller.

15. The method according to claim 14, wherein in response to a selection of a particular active area in the product region corresponding to a name of the product, presenting, in a second view on the display, a plot including a graph of the order history data including a price of the product between the buyer and the one or more sellers over a time period, wherein the first view is not presented on the display when the second view is presented on the display and wherein the second view is not presented on the display when the first view is presented on the display.

16. The method according to 14, wherein in response to the selection of the particular active area in the product region corresponding to the name of the product, further presenting, in a second view on the display, a plot including a graph of an average price of the product sold by the one or more sellers over the time period, wherein the first view is not presented on the display when the second view is presented on the display and wherein the second view is not presented on the display when the first view is presented on the display.

17. The method of claim 14, wherein the first plurality of active areas are displayed in the order based on the order history of the buyer with each seller, a review score of the product from each seller, a price of the product from each seller and a location of each seller.

18. An apparatus comprising:
a display;
an input device;
at least one processor; and
at least one memory including one or more sequences of instructions, said memory further comprising,
 a first data structure having a plurality of records and wherein each record includes a first field for holding data indicating a product, a second field for holding data indicating an identifying criteria of the product and a third field for holding data indicating a seller of the product, and
 a second data structure, said second data structure having a plurality of records and wherein each record stores data of a buyer and includes a field for holding data indicating an order history comprising a number of prior transactions or units sold between the buyer and a seller of the product,
the at least one memory and the one or more sequences of instructions configured to, with the at least one processor, cause the apparatus to perform at least the following,
 receive inputted identifying criteria of a product from a buyer;
 determine each record of the first data structure with the second field having data corresponding to the inputted identifying criteria;
 present on the display a first view with an active area and data indicating the product corresponding to the inputted identifying criteria based on the first field of each record of the first data structure corresponding to the inputted identifying criteria;
 determine a first plurality of sellers of the product corresponding to a selected active area in the first view, said first plurality of sellers based on the third field data of the record of the first data structure corresponding to the product;
 transmit a signal to the first plurality of sellers to request a relationship with the buyer;
 receive a signal from a second plurality of sellers comprising one or more of the first plurality of sellers to confirm the relationship with the buyer;
 present on the display a second view different from the first view such that the first view is not presented on the display when the second view is presented on the display, said second view includes the second plurality of sellers for the product arranged in an order based on the order history between the buyer and each seller from the data field of the second data structure;
 present in the second view the order history of the buyer for the product with the second plurality of sellers;
 present in the second view a plurality of active areas including data indicating the number of prior transactions or units sold of the order history between the buyer and the second plurality of sellers;
 modify the second view to present additional data regarding the number of prior transactions or units sold based on input of an icon moved by the input device over one of the plurality of active areas for a minimum time period; and
 present on the display a total price of a particular quantity of the product, in response to selection of the particular quantity of the product.

* * * * *